(12) United States Patent
Lee et al.

(10) Patent No.: US 11,639,425 B2
(45) Date of Patent: May 2, 2023

(54) NANOCOMPOSITE FILMS AND METHODS FOR PRODUCING THE SAME

(71) Applicant: The Trustees of the University of Pennsylvania, Philadelphia, PA (US)

(72) Inventors: Daeyeon Lee, Wynnewood, PA (US); Yun-Ru Huang, Philadelphia, PA (US); Shu Yang, Blue Bell, PA (US); Dengteng Ge, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 15/310,172

(22) PCT Filed: May 12, 2015

(86) PCT No.: PCT/US2015/030391
§ 371 (c)(1),
(2) Date: Nov. 10, 2016

(87) PCT Pub. No.: WO2015/175543
PCT Pub. Date: Nov. 19, 2015

(65) Prior Publication Data
US 2017/0260347 A1    Sep. 14, 2017

Related U.S. Application Data

(60) Provisional application No. 62/026,802, filed on Jul. 21, 2014, provisional application No. 61/991,984, filed on May 12, 2014.

(51) Int. Cl.
| | |
|---|---|
| *C08J 5/18* | (2006.01) |
| *B05D 3/02* | (2006.01) |
| *B08B 17/06* | (2006.01) |
| *B82Y 30/00* | (2011.01) |
| *B05D 5/00* | (2006.01) |
| *B82Y 40/00* | (2011.01) |
| *B05D 5/08* | (2006.01) |
| *B05D 1/00* | (2006.01) |
| *C08K 3/22* | (2006.01) |
| *B05D 3/06* | (2006.01) |

(52) U.S. Cl.
CPC ............. *C08J 5/18* (2013.01); *B05D 1/005* (2013.01); *B05D 3/0254* (2013.01); *B05D 5/00* (2013.01); *B05D 5/08* (2013.01); *B08B 17/06* (2013.01); *B82Y 30/00* (2013.01); *B82Y 40/00* (2013.01); *C08K 3/22* (2013.01); *B05D 3/0209* (2013.01); *B05D 3/067* (2013.01); *C08J 2325/06* (2013.01); *C08K 2003/2241* (2013.01); *C08K 2201/011* (2013.01)

(58) Field of Classification Search
CPC ....... C08J 5/18; C08K 2201/011; B08B 17/06
See application file for complete search history.

(56) References Cited

U.S. PATENT DOCUMENTS

| | | | |
|---|---|---|---|
| 6,835,766 B1 | 12/2004 | Gao et al. | |
| 2003/0136946 A1* | 7/2003 | Kumacheva | C08J 9/32 252/500 |
| 2003/0174994 A1* | 9/2003 | Garito | B82Y 20/00 385/129 |
| 2008/0171219 A1 | 7/2008 | Mitlin et al. | |
| 2010/0019209 A1* | 1/2010 | Meng | B82Y 30/00 252/511 |
| 2010/0140551 A1* | 6/2010 | Parce | B82Y 20/00 252/301.36 |
| 2010/0308277 A1* | 12/2010 | Grupp | H01M 4/043 252/506 |
| 2012/0295448 A1* | 11/2012 | Miller | H01L 29/511 438/778 |
| 2013/0115455 A1* | 5/2013 | Banin | C09K 11/025 428/375 |
| 2013/0130951 A1* | 5/2013 | Sinha | C10M 7/00 508/107 |

FOREIGN PATENT DOCUMENTS

GB    2510211 A    * 7/2014

OTHER PUBLICATIONS

Deshmukh et al; Chem. Mater., 2007, 19, pp. 745-754. (Year: 2007).*
Jiguet et al.; "SU-8 nanocomposite . . . microfabrication applications", Micoelectronic Engineering, 83, pp. 1966-1970 (Year: 2006).*
Jiguet et al.; "SU-8 nanocomposite . . . for MEMS", Surface and Coatings Technology; 201, pp. 2289-2295. (Year: 2006).*
International Preliminary Report on Patentability for Internatinal Application No. PCT/US2015/030391, dated Nov. 15, 2016, 8 pages.
International Search Report for International Application No. PCT/US2015/030391 dated Aug. 7, 2015.

* cited by examiner

*Primary Examiner* — Karuna P Reddy
(74) *Attorney, Agent, or Firm* — BakerHostetler

(57) ABSTRACT

A method of producing a nanocomposite film includes generating a bilayer film including at least a first layer of at least one nanoparticle and a second layer of at least one material and annealing the bilayer film. A uniform nanocomposite film includes a plurality of nanoparticles dispersed in a polymer matrix, wherein the plurality of nanoparticles form at least 60% by volume of the polymer nanocomposite film.

31 Claims, 24 Drawing Sheets

FIG. 9A 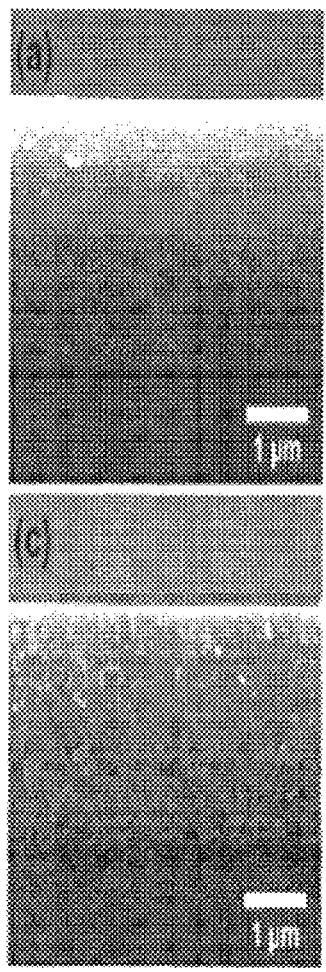 FIG. 9B 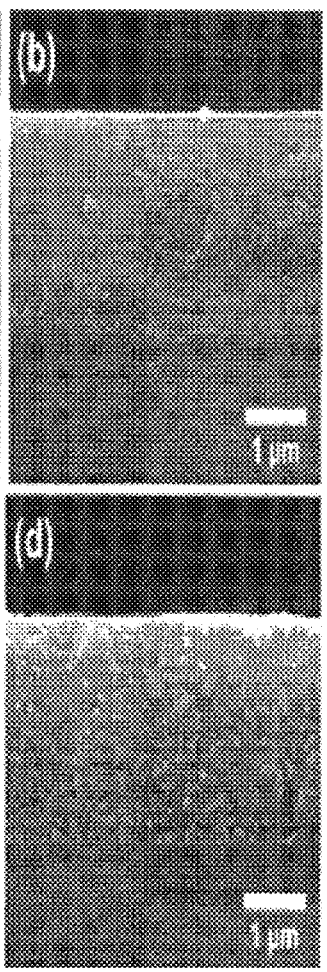
FIG. 9C     FIG. 9D

FIG. 10E
FIG. 10F
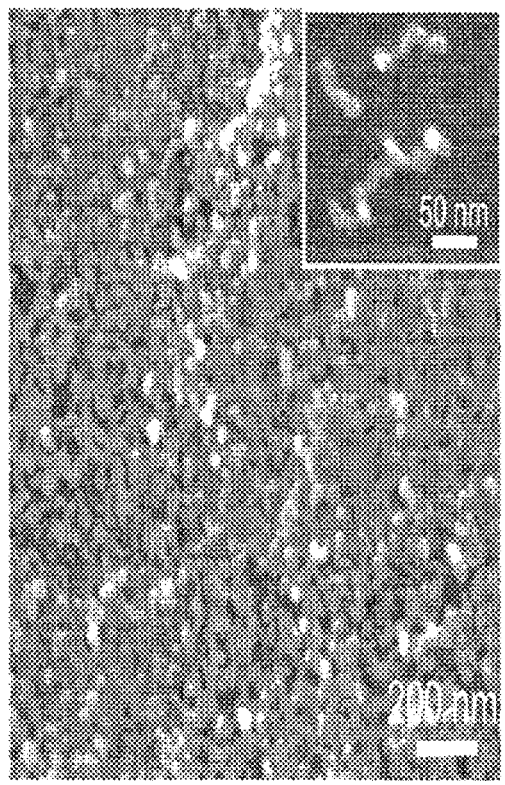

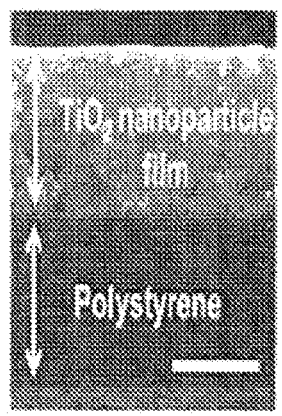 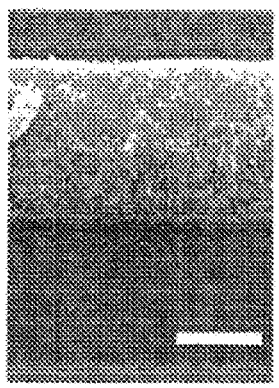 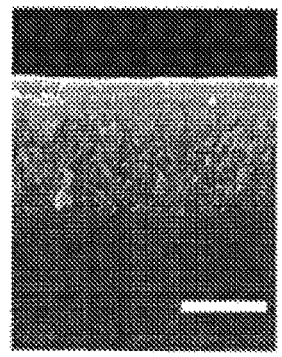
FIG. 15A FIG. 15B FIG. 15C
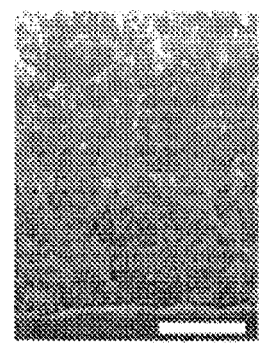 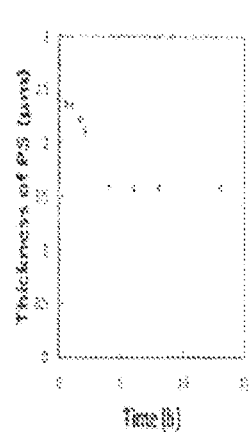 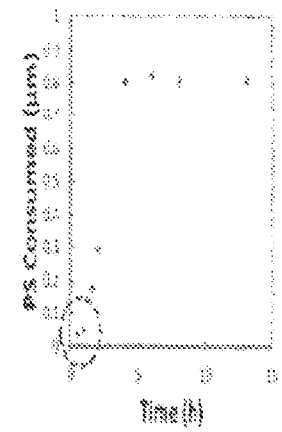
FIG. 15D FIG. 15E FIG. 15F

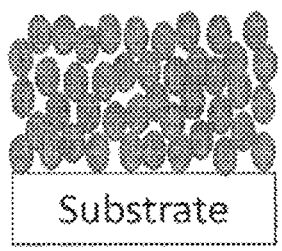
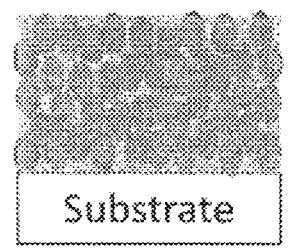
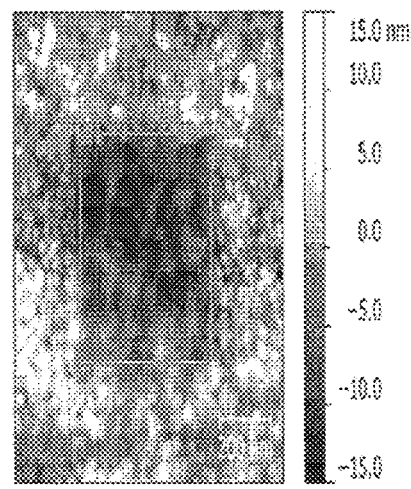
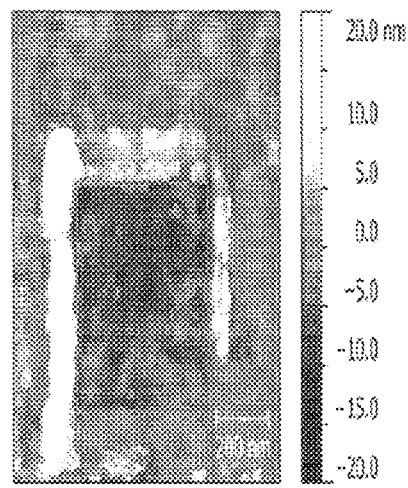
FIG. 17A  FIG. 17B

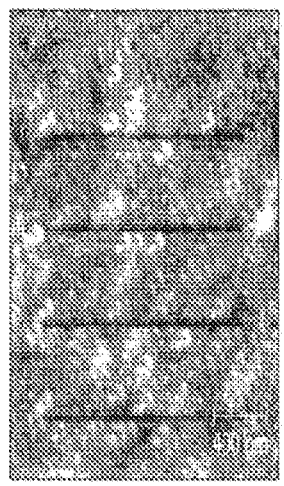 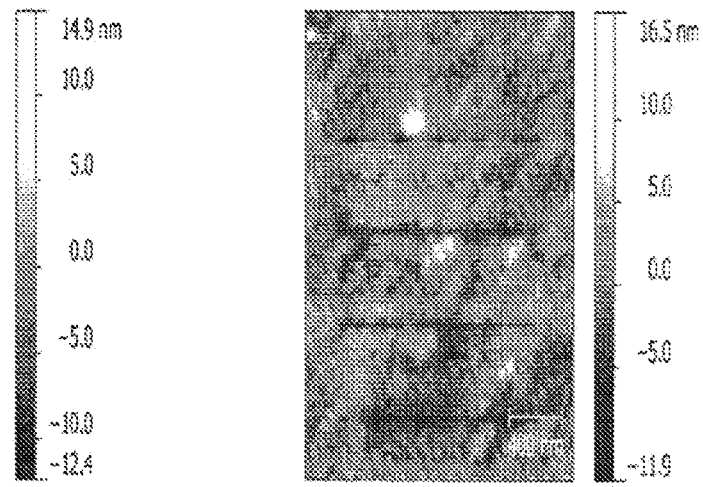
FIG. 18A          FIG. 18B
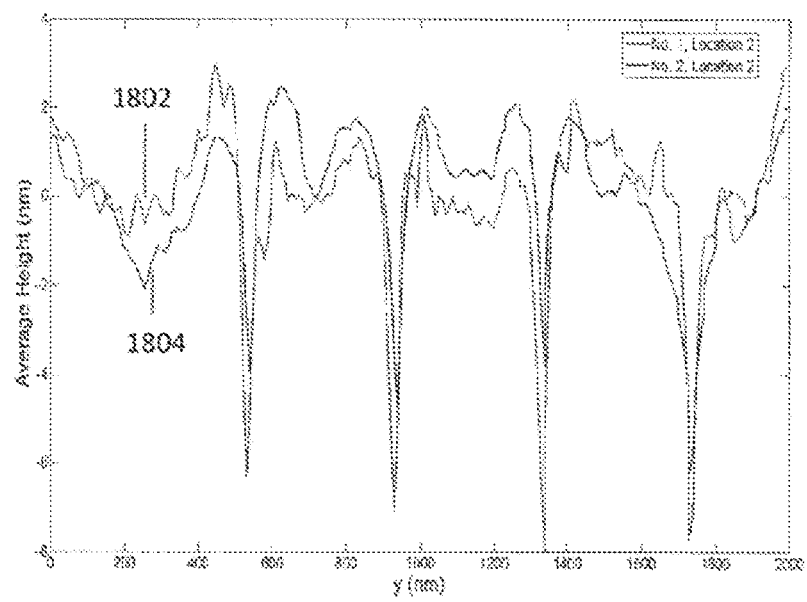
FIG. 18C

NANOCOMPOSITE FILMS AND METHODS FOR PRODUCING THE SAME

CROSS-REFERENCE TO RELATED APPLICATIONS

This application is a U.S. national phase application of International Application No. PCT/US2015/030391, filed May 12, 2015 which claims priority to U.S. Provisional application Ser. No. 61/991,984 entitled Nanocomposite Films and Methods for Producing the Same filed on May 12, 2014 and U.S. Provisional application Ser. No. 62/026,802 entitled Fabrication of Highly Transparent and Anti-Smudge Plastic Films filed on Jul. 21, 2014, the contents of which are incorporated fully herein by reference.

GOVERNMENT RIGHTS

This invention was made with government support under grant numbers DMR1055594 and DMR1120901 awarded by the National Science Foundation. The government has certain rights in the invention.

FIELD OF THE INVENTION

This invention relates to nanocomposite films and processes for producing nanocomposite films.

BACKGROUND OF THE INVENTION

Nanocomposite films comprise dispersions of nanoparticles in a matrix of a polymeric, amorphous, crystalline, semi-crystalline, molecular glass, metal glass, or other material. As one example, polymer nanocomposite (PNC) films combine the unique properties of nanomaterials with the toughness, flexibility and high processability of polymers, often resulting in materials with synergistic properties and functionalities. PNC films comprise dispersions of nanoparticles in a polymer matrix and present unique opportunities for fabricating materials with combinations of distinct properties. Nanoparticles provide unique electronic, photonic, plasmonic and transport functionality, whereas the chemical diversity of polymers brings highly versatile properties from toughness to flexibility to intricate nanostructures. PNC films with desirable optical, catalytic, separation and mechanical properties, in particular, find numerous applications as coatings, electrodes and membranes. The generation of PNC films with high loadings of rigid nanoparticles, however, is challenging because their processability becomes extremely poor due to the high viscosity and elasticity of such mixtures.

Building windows, solar panels, car windows, windshields, and smartphone screens and computer displays are constantly exposed to damaging environmental conditions, including dirt, oil, acid water, sand, ice, salt, sun, pollution, and bird droppings. Cleaning these surfaces requires intensive labor and energy consumption. More importantly, it requires the use of chemical agents to wash, scrub, and polish the surface, which could be harmful to consumers and the environment. There have been efforts to create superhydrophobic surfaces with water contact angle (WCA) of 150° or greater and very small contact angle hysteresis (CAH, typically <10°), mimicking the hierarchical surface roughness exhibited in natural systems, including the use of nanoporous hydrophobic polymers, sol-gels, polymeric and inorganic nanoparticles, and nanowires for potential applications including anti-fouling, and self-cleaning, drag-force reduction, droplet transfer in microfluidics, and anti-frost/anti-icing.

Oil repellency is particularly appealing for touch panel screens, window, solar panels, as well as food and chemical packaging/storage. For example, the implementation of touch screen panel technology enabled multi-point finger touching by user imposes an issue of surface fouling and deterioration due to fingerprints (or smudges) left on a product's surface by repeated touch. However, it is considerably more challenging to develop a coating that repels both water and oil, since oil has a much lower surface energy than water. It has been shown that the re-entrant or fractal-like surface together with perfluorinated surface chemistry can achieve extreme resistant to a number of organic liquids with low surface tension, so-called superamphiphobic surfaces. While these coatings are robust against waterjetting, oil repellency will decrease after repeated finger rubbing.

There are methods such as in situ polymerization and layer-by-layer (LbL) assembly that have been shown to give PNC films with high filler concentrations. in situ polymerization involves forming a mixture of monomers and nanoparticles and subsequently polymerizing the monomers. Although relatively straightforward to implement, this approach may lead to demixing of the two materials and also result in incomplete polymerization or in highly polydisperse polymers. LbL assembly, while having the advantage of generating conformal films, is time consuming and is typically limited to water-soluble materials. These methods also have limitations in creating composites, in which the nanoparticle inclusions form a percolated network, which is often necessary in applications involving transport through nanoparticles (e.g., electron transport, charge transport, phonon transport, mechanical strain/stress transport etc.).

Silica nanoparticles, which are readily available and functionalizable, have been studied to create transparent, superhydrophobic and sometimes highly oleophobic surfaces by dip coating, spin coating, layer-by-layer assembly, spray coating, and templating methods. The surface roughness can be controlled by the size and shape of the nanoparticles, and the morphology of the nanoparticle assembly.

The inventors have recognized that it would be useful to provide a PNC film with high loadings of nanoparticles, there is a need for a simple method that can use a broad array of components to produce uniform PNC films, and that it would also be desirable to generate a three phase PNC film composed of uniformly distributed nanoparticles and nanopores in a matrix materials such as a polymer. Additionally, the inventors have recognized that it would be useful to provide a PNC smudge-resistant film, there is a need for a simple method to produce smudge-resistant PNC films, and that it would also be desirable to generate a three-phase PNC film composed of nanoparticles and interspersed nanopores in matrix materials such as a polymer.

SUMMARY OF THE INVENTION

Aspects of the invention relate to methods for producing PNC films, PNC films produced by the inventive methods, and PNC films.

In accordance with one aspect, the invention provides a method of producing a PNC film. The method includes generating a bilayer film of a layer of at least one nanoparticle and a layer of at least one material and annealing the bilayer film.

In accordance with another aspect, the invention provides PNC film obtained by the inventive method described above.

In accordance with yet another aspect, the invention provides a uniform polymer PNC film which includes a plurality of nanoparticles dispersed in a polymer matrix, wherein the plurality of nanoparticles form at least 60% vol. of the polymer PNC film.

In accordance with still another aspect, the invention provides a method of producing a composite film. The method includes generating a bilayer film including at least a first layer of at least one particle and a second layer of at least one material, the at least one particle selected from the group consisting of micron particles, millimeter particles, and nanoparticles, and annealing the bilayer film.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIGS. 9A through 9D depict SEM images of polymer PNC films generated by capillary rise infiltration (CaRI) of polystyrene into ellipsoidal anisotropic $TiO_2$ nanoparticle layers having different aspect ratios in accordance with aspects of the present invention;

FIGS. 10C through 10F depict SEM images of PNC films including fluorinated stringed nanoparticles and SU-8 polymer before and after embedding of the stringed nanoparticles in the SU-8 film in accordance with aspects of the present invention;

FIG. 15A is a cross-sectional SEM image of $TiO_2$ nanoellipsoid/polystyrene bilayer annealed at 130° C. under vacuum for 0 hours in accordance with aspects of the present invention;

FIG. 15B is a cross-sectional SEM image of $TiO_2$ nanoellipsoid/polystyrene bilayer annealed at 130° C. under vacuum for 2 hours in accordance with aspects of the present invention;

FIG. 15C is a cross-sectional SEM image of $TiO_2$ nanoellipsoid/polystyrene bilayer annealed at 130° C. under vacuum for 4 hours in accordance with aspects of the present invention;

FIG. 15D is a cross-sectional SEM image of $TiO_2$ nanoellipsoid/polystyrene bilayer annealed at 130° C. under vacuum showing infiltration of the polystyrene into the nanoparticle film in accordance with aspects of the present invention;

FIG. 15E is a graphical representation of the thickness of the polystyrene layer as a function of annealing time in accordance with aspects of the present invention;

FIG. 15F is a graphical representation of the amount of polystyrene consumed as a function of annealing time in accordance with aspects of the present invention;

FIG. 17A is an SEM image of a $TiO_2$ nanoellipsoid film undergoing wear testing in accordance with aspects of the present invention;

FIG. 17B is an SEM image of a $TiO_2$ nanoellipsoid/polystyrene PNC film in accordance with aspects of the present invention undergoing wear testing;

FIG. 18A is an SEM image of a $TiO_2$ nanoellipsoid film undergoing scratch testing in accordance with aspects of the present invention;

FIG. 18B is an SEM image of a $TiO_2$ nanoellipsoid/polystyrene PNC film in accordance with aspects of the present invention undergoing scratch testing;

FIG. 18C is a graphical representation of the results of scratch testing of a $TiO_2$ nanoellipsoid film and a $TiO_2$ nanoellipsoid/polystyrene PNC film in accordance with aspects of the present invention;

DETAILED DESCRIPTION OF THE INVENTION

Figure 1:
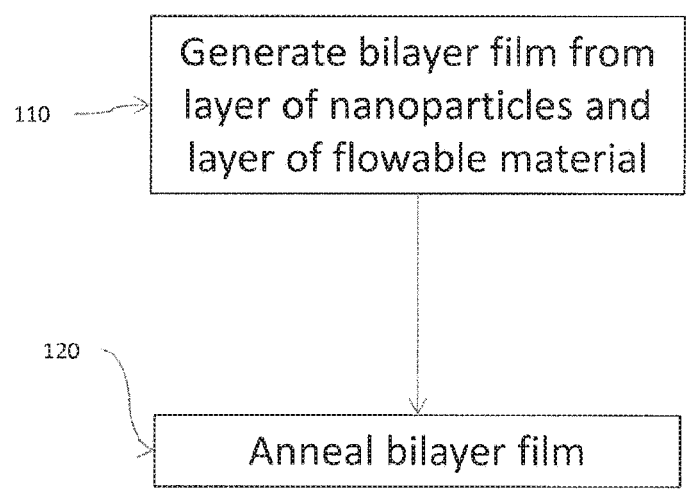
FIG. 1 is a flow diagram of a method for producing PNC films in accordance with aspects of the present invention.

Aspects of the invention are directed to methods for producing PNC films, PNC films produced by the inventive methods, and PNC films in general. Methods according to aspects of the invention include generating a bilayer film including at least a first layer of at least one nanoparticle and a second layer of at least one material and annealing the bilayer film.

A uniform PNC film according to aspects of the invention includes a plurality of nanoparticles dispersed in a polymer matrix, wherein the plurality of nanoparticles form at least 60% volume of the PNC film. A PNC film is also prepared according to the processes described herein.

Nanocomposite films according to aspects of the invention, where constructed with a polymer layer, have uniform and substantially complete polymerization. The PNC films disclosed herein have high loadings of nanoparticles which may exceed 60% by volume. The inventive processes may produce a PNC film in which the interstitial voids of the nanoparticles are completely saturated with a polymer, amorphous, crystalline, semi-crystalline, metallic glass, molecular glass or other material. Alternatively, the inventive processes may produce a PNC film in which the interstitial voids are partially saturated with such materials, resulting in three phases, i.e., uniformly distributed nanoparticles and nanopores in a matrix. PNC films according to the present invention exhibit enhanced mechanical properties including increased strength, toughness, hardness, wear resistance, and scratch resistance.

While PNC films are discussed herein to illustrate certain principles of the invention by way of example, one of ordinary skill in the art will understand that materials such as amorphous, crystalline, semi-crystalline, metallic glass, molecular glass or other flowable materials may be used in place of polymer materials to create other types of nanocomposite films while remaining within the scope of the present invention. One of ordinary skill in the art will further understand that materials which are particularly well-suited for use in producing nanocomposite films are flowable materials, i.e., those which can, upon annealing, infiltrate the interstitial voids of the nanoparticles.

Likewise, while nanoparticles are discussed herein to illustrate certain principles of the invention by way of example, one of ordinary skill in the art will understand that other particles, such as micron and millimeter particles may be used in place of nanoparticles while remaining within the scope of the present invention.

As used herein, an "nanocomposite film" refers to a film formed of a dispersion of nanoparticles into a matrix made of an amorphous, crystalline, semi-crystalline, metallic glass, molecular glass or other material able to flow into the interstitial voids of nanoparticles.

As used herein, "annealing" includes both thermal annealing and solvent vapor annealing, or a combination of both of these techniques. Thermal annealing includes a heat treatment that alters the microstructure of a material. The heat treatment can involve, e.g., heating a polymer above its glass transition temperature. Solvent vapor annealing includes the introduction of the vapor of a solvent that is able to make, e.g., a polymer soft and mobile, i.e., flowable.

As used herein, "interstitial voids" refers to the pores of a nanoparticle film.

In FIG. 1, a flow diagram depicting selected steps of a process 100 for producing a nanocomposite film according to aspects of the invention is shown. It should be noted that, with respect to the methods described herein, it will be understood from the description herein that one or more steps may be omitted and/or performed out of the described sequence of the method while still achieving the desired result.

In step 110, a bilayer film is generated. The bilayer film is manufactured from a first layer of at least one nanoparticle and a second layer of at least one material. One of ordinary skill in the art will understand that these layers can be arranged in any order, that is, both the first layer of at least one nanoparticle and the second layer of at least one material can be either the top layer or the bottom layer.

The first layer of at least one nanoparticle is a layer or film of one or more types of nanoparticle. In general, all types of nanoparticles suitable for the first layer of at least one nanoparticle. That is, suitable nanoparticles include, without limitation, oxide nanoparticles (e.g., $SiO_2$, $TiO_2$, $Al_2O_3$), metal nanoparticles (e.g., gold, silver), semiconductor nanoparticles (e.g., CdSe, CdTe, ZnSe, PbS), catalytic nanoparticles (Pt), and magnetic nanoparticles (iron oxide). Suitable nanoparticles also include "stringed" nanoparticles, which include linear or branched arrays of contiguous nanoparticles. Stringed nanoparticles may also be functionalized (e.g., fluorinated), without departing from the invention. In one embodiment, the first layer of at least one nanoparticle is a layer of $TiO_2$ nanoparticles. In other embodiments, the first layer of at least one nanoparticle includes more than one type of nanoparticle. In yet other embodiments, the first layer of at least one nanoparticle includes stringed $SiO_2$ (silica) nanoparticles.

The first layer of at least one nanoparticle includes a packing of nanoparticles that is less than the close pack density. As a result, the first layer of at least one nanoparticle will include interstitial voids, or pores, in the nanoparticle film. The specific void fraction at close pack density depends on the shape of the nanoparticles. For example, spherically shaped particles at close pack density can have a void fraction of 64% by volume.

The second layer of at least one material includes one or more types of flowable materials. As described above, it is desirable to use flowable materials, i.e., those which can, upon annealing, infiltrate the interstitial voids of the nanoparticles, for this layer. Suitable materials include polymer, amorphous, crystalline, semi-crystalline, metallic glass, molecular glass and other flowable materials. In an embodiment, the second layer of at least one material includes more than one type of flowable material.

In one embodiment, the second layer of at least one material is an amorphous material. Suitable amorphous materials include, without limitation, polystyrene, polymethylmethacrylate, polysulfone, polyetherimide, polyvinyl chloride, polycarbonate, SU-8 polymer, or metallic glasses.

In another embodiment, the second layer of at least one material is a crystalline or semi-crystalline material. Suitable materials from this group include, without limitation, polyethylene, polypropylene, nylon, and polyethyleneterephthalate.

In yet another embodiment, the second layer of at least one material is a metal or molecular glass (e.g., a sugar glass).

In another embodiment, the second layer of at least one material includes a layer of polymer that is (i) thermoplastic photoresist or (ii) thermoplastic polymer. The thermoplastic photoresist may be SU-8 polymer in some embodiments.

In still another embodiment, the first layer of at least one nanoparticle is a layer of $TiO_2$ nanoparticles and the second layer of at least one material is polystyrene.

In another embodiment, the first layer of at least one nanoparticle includes stringed silica nanoparticles, and the second layer of at least one material is SU-8 polymer.

In one embodiment, the bilayer film is generated on a suitable substrate. Suitable substrates include any material that can provide mechanical support including, without limitation, glass, plastics, wafers, adhesives, metals, oxides. The first layer of at least one nanoparticle and the second layer of at least one material can be deposited onto the substrate to form the bilayer film according to a variety of methods known to one of ordinary skill in the art including, but not limited to, flow coating, spin coating, and dip coating.

In step 120, the bilayer film is annealed. During the annealing step, the second layer of at least one material infiltrates, e.g., flows into the interstitial voids of the nanoparticle film. This phenomenon is analogous to the capillary rise of common liquids into a porous medium. As a result, the second layer of at least one material generally become smaller while the first layer of at least one nanoparticle remains constant in size. Nanoparticles, where packed at or close to the close pack density, i.e., a interlocked and jammed system, do not change their configuration. Thus, by tracking the residual film of the second layer of at least one material, it is thereby possible to estimate how much material of this layer has infiltrated the nanoparticle film.

The bilayer film may be annealed using thermal annealing or solvent vapor annealing. In one embodiment, the second layer of at least one material is an amorphous material, and annealing includes heating the bilayer film above the glass transition temperature for the amorphous material.

Step 120 may continue until complete saturation of the nanoparticle film is achieved, i.e., the interstitial voids are completely filled with the infiltrating second layer of material. Alternatively, step 120 may terminate prior to complete saturation, resulting in incomplete saturation, where the interstitial voids are not entirely filled with the infiltrating second layer of material. Incomplete saturation may be obtained by limiting the amount of the second layer of at least one material in the bilayer film (e.g., providing less than the amount needed to fill the interstitial voids of the nanoparticle film), or by terminating the annealing process (e.g., by removing the thermal energy or solvent used to bring about annealing).

The generation of PNC films with high loadings of rigid nanoparticles was previously challenging because their processability becomes extremely poor due to the high viscosity and elasticity of such mixtures. Surprisingly, the inventive processes disclosed herein may be used to readily prepare PNC films with nanoparticle loadings ranging from 10% by volume (i.e., where nanoparticles form at least 10% by volume of the total volume of the PNC film) up to the void fraction amount for the particular nanoparticles. The maximum loading depends on the specific geometry and packing density of the nanoparticles. For example, in case of randomly packed spherical particles at close packing density, a nanoparticle loading of 64% by volume can be achieved. With respect to ordered spherical particle at close pact density, a nanoparticle loading of 74% by volume can be achieved.

Figure 2:
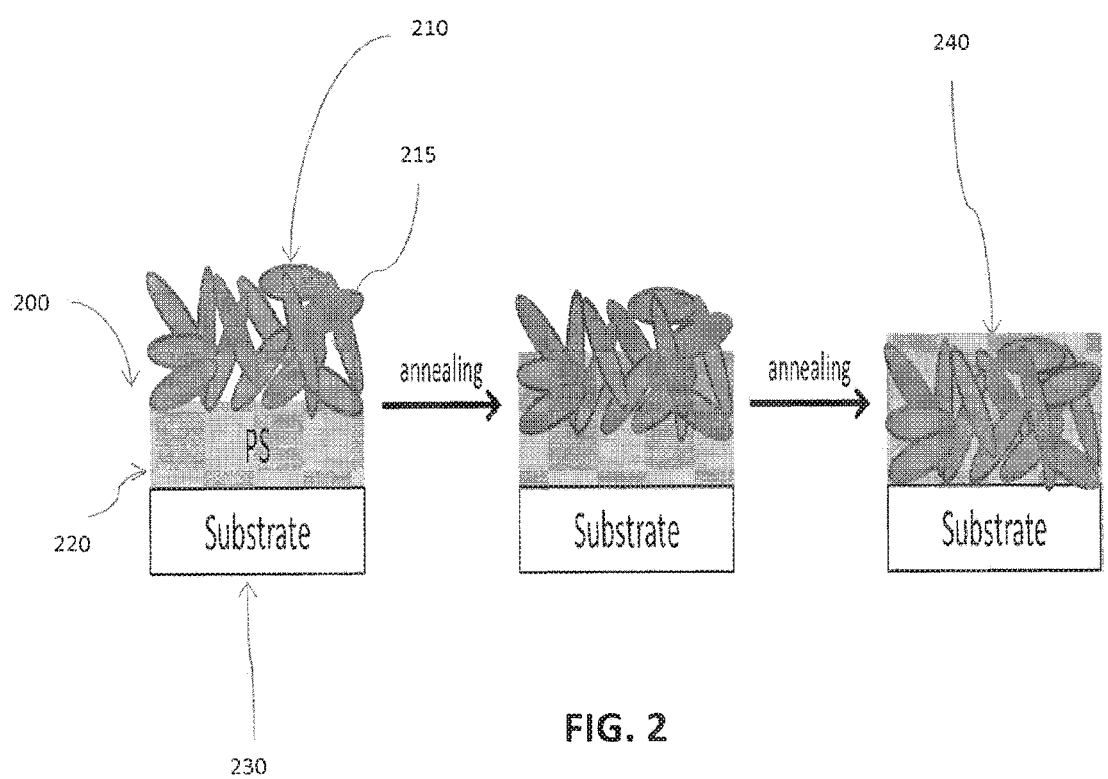
FIG. 2 is a schematic illustration of a method for producing a completely saturated PNC film in accordance with aspects of the present invention.
Figure 3A:
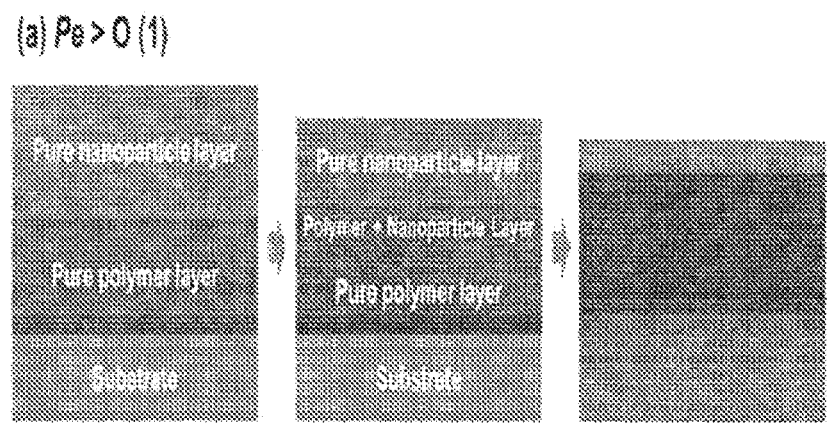
FIG. 3 is a table describing modes of material transport in a nanoparticle film where Pe>O (1) and Pe<O (1) in accordance with aspects of the present invention.
Figure 3B:
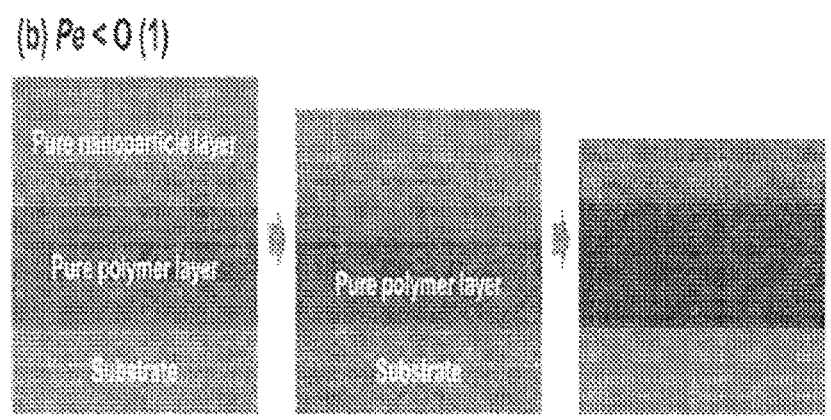

FIG. 2 illustrates steps of process 100 resulting in a completely saturated PNC film (i.e., where the interstitial voids of the nanoparticle film are filled with the second layer of material) in accordance with one embodiment. A bilayer film 200 made of a layer of $TiO_2$ nanoparticles 210 and a layer of polystyrene (PS) 220 is deposited onto a substrate 230. The layer of $TiO_2$ nanoparticles 210 includes a plurality of interstitial voids 215. Before annealing, the layer of $TiO_2$ nanoparticles 210 and the layer of polystyrene 220 are entirely separate and discrete layers. The bilayer film 200 is annealed, and the layer of polystyrene 220 begins to infiltrate the plurality of interstitial voids 215. Once the plurality of voids 215 are entirely infiltrated by the layer of polystyrene 220, complete saturation is achieved, and annealing ceases. The polymer PNC film 240 is completely saturated.

The cessation of the second layer of material infiltrating the first layer of at least one nanoparticle may be confirmed visually (i.e., by noting that the thickness of the second layer of material is no longer shrinking and is remaining constant). Additionally, in situ ellipsometry may be used to monitor the change in thickness of the different layers during annealing. In particular, the three layers observable during the annealing process—the pure polymer layer, the polymer-nanoparticle composite layer, and the pure nanoparticle layer—have optical properties that can be independently measured by creating and performing ellipsometry on corresponding samples. Moreover, by applying conservation of mass, it is possible to deduce the relationship among the thicknesses of the three distinct layers. Based on these conditions and measurements of the thicknesses of the three distinct layers, it is possible to determine the thicknesses of the three layers as a function of annealing time. For polymer systems which are dominated by diffusion small angle neutron scattering (SANS) and/or Rutherform backscattering spectroscopy (RBS) may be used to characterize the concentration profile within the nanoparticle films as a function of time.

These three methods—ellipsometry, SANS and RBS—are complementary; while ellipsometry allows for straightforward in situ monitoring of polymer infiltration in our laboratory, SANS allows for characterization of the structure of PNC films in addition to the in situ monitoring of the dynamics of polymer infiltration. RBS is an ideal method to characterize the concentration profile through the thickness of the PNC films with high resolution.

Figure 4A:
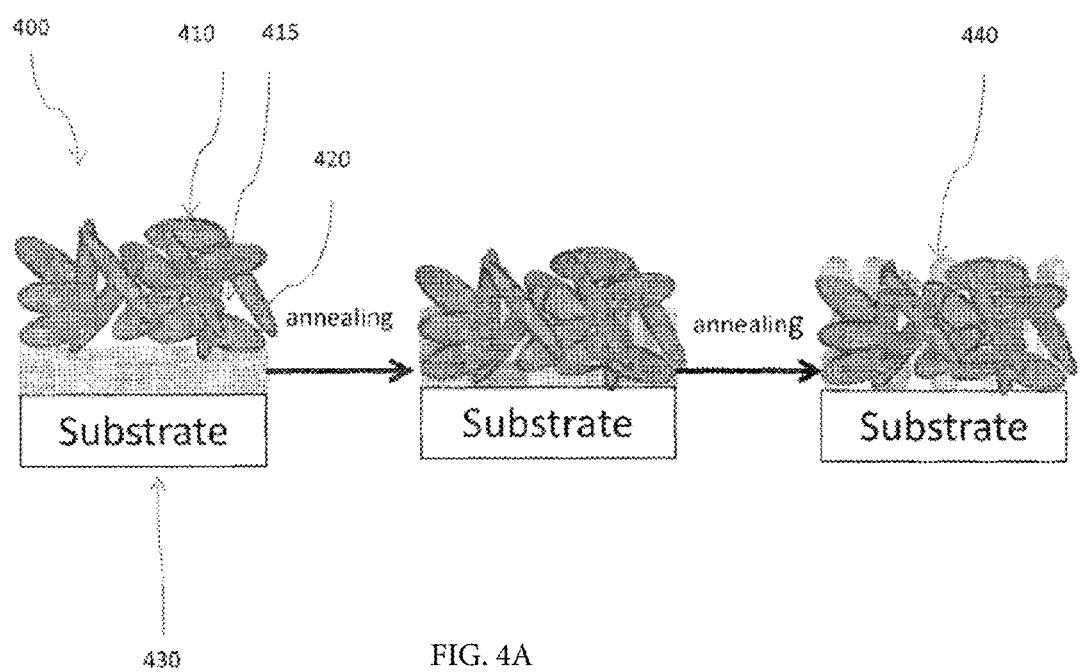
FIG. 4A is a schematic illustration of a method for producing an incompletely saturated PNC film in accordance with aspects of the present invention.

FIG. 4A illustrates steps of process 100 resulting in an incomplete saturation of the PNC film (i.e., where the interstitial voids of the nanoparticle film are not completely filled with the second layer of material) in accordance with one embodiment. A bilayer film 400 made of a layer of $TiO_2$ nanoparticles 410 and a layer of polystyrene 420 is deposited onto a substrate 430. Layer of $TiO_2$ nanoparticles 410 includes a plurality of interstitial voids 415. Bilayer film 400 is annealed, and layer of polystyrene 420 begins to infiltrate plurality of interstitial voids 415. In this particular embodiment, plurality of voids 415 are not entirely infiltrated by layer of polystyrene 420, and the resulting PNC film 440 is not completely saturated.

If the initial amount of polymer is not sufficient to completely fill the interstices of a nanoparticle film, annealing such a sample may lead to formation of three phase PNC films with uniformly distributed nanoparticles and nanopores. By adjusting the thickness of the polymer under the nanoparticle film so that polymer cannot completely fill the voids in the nanoparticle film, a two stage process may result. In the first stage, the polymer infiltrates the nanoparticle film based on the expected transport mechanism. Once the polymer reservoir has been completely "consumed", the infiltrated polymer may distribute evenly across the thickness of the nanoparticle film, by localizing at regions of high curvatures; that is, "smaller pores" in the nanoparticle films will be filled with polymer. This process is analogous to capillary condensation in which the condensation of liquid from the vapor phase in packings of particles occurs preferentially in the regions of high curvature; that is the system minimizes its total surface free energy by localizing the liquid (i.e., polymer) in the regions of high curvature which would be the necks between nanoparticles. Also studies have shown that water can flow in under saturated granular porous medium by localizing in the regions of high curvature regions. By forming capillary funicular structures within the nanoparticle films, the polymer can transport into different regions of the films and evenly distribute throughout the PNC films.

Accordingly, incompletely saturated PNC film 440 may be characterized by three phases, i.e., uniformly distributed $TiO_2$ nanoparticles and nanopores in a polystyrene matrix. In this regard, the inventive processes permit tunable void volume and void size based upon the controlled loading of the annealing polymer and the size/shape of the nanoparticles.

Figure 4B:
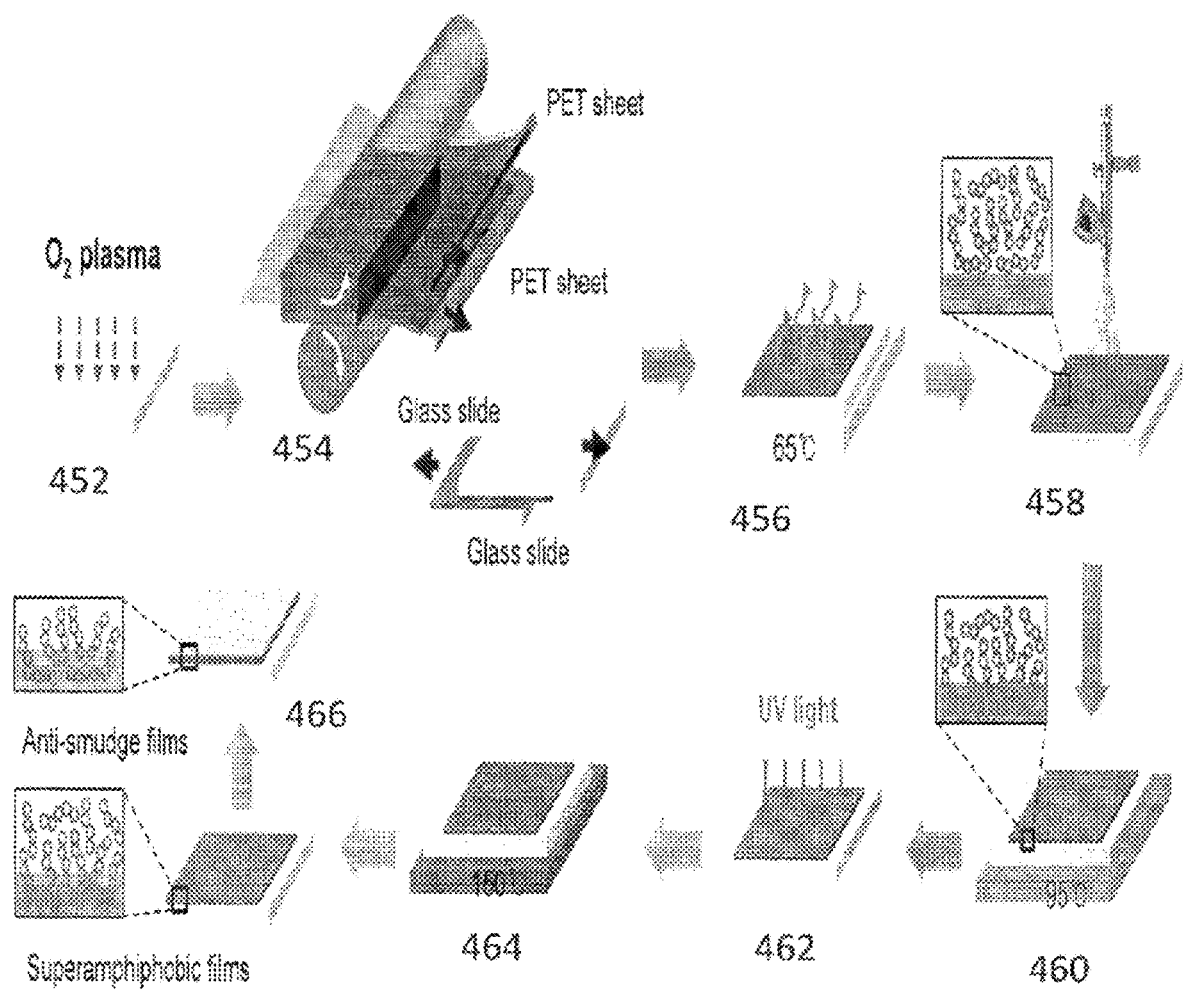
FIG. 4B is a schematic illustration of a method for producing a smudge-resistant, superamphiphobic PNC film having partially embedded stringed silica nanoparticles in accordance with aspects of the present invention.

FIG. 4B depicts steps of process 450 for fabricating transparent, superamphiphobic PNC films with smudge-resistant properties in accordance with one embodiment. At step 452, substrates polyethylene terephthalate sheets (PET, 20 μm thick) and glass are treated with gentle oxygen plasma to produce hydroxyl groups for improved wettability and adhesion of polymer. At step 454, the epoxy-based photoresist SU-8 polymer in γ-butyrolactone (GBL) is either dispensed between PET sheets and passed through two rollers to flatten the thickness of the SU-8 film, or SU-8/GBL solution is dropped onto two glass slides and pulled out in a horizontal direction at 5 mm/sec. After polymer coating, the substrates (PET or glass) are separated with each being covered with half of the original volume of SU-8 polymer.

A variety of thermoplastic polymers may be used in accordance with aspects of the invention. In some embodiments, the thermoplastic polymer includes one or more of high density polyethylene (HDPE), low density polyethylene (LDPE), thermoplastic polyrurethane (TPU), and polystyrene (PS). In some embodiments, an ideal polymer is a polymer capable of UV-crosslinking and curing.

After coating with SU-8 polymer, the substrates are heated to 65° C. for 1 minute to remove GBL solvent at step 456. The substrate is then cooled to room temperature. At step 458, 0.2 mL/inch$^2$ stringed fluorinated silica nanoparticles prepared via sol-gel reactions of stringed silica nanoparticles, (heptadecafluoro-1, 1, 2, 2,-tetrahydrodecyl) triethoxysilane (HDFTES), and tetraethyl orthosilicate (TEOS) are sprayed onto the SU-8 polymer film via airbrush at 20 psi. "Stringed nanoparticles" as used herein refer to a linear or branched array of contiguous nanoparticles, typically, but not necessarily, having a diameter of less than 20 nm, and an overall length of less than 100 nm. In some aspects of the present invention, the diameter of stringed nanoparticles is 10-15 nm, and the overall length is 40-100 nm.

During spray coating of the stringed nanoparticles, the nanoparticles are dissolved in an appropriate solvent, such as ethanol, to avoid plasticizing the polymer film of SU-8. Ethanol is a poor solvent of SU-8. In this way, partial diffusion of the stringed nanoparticles into the SU-8 is avoided.

A bilayer film made of a layer of stringed fluorinated silica nanoparticles and a layer of SU-8 polymer is now present. The layer of stringed fluorinated silica nanoparticles includes a plurality of interstitial voids. Before annealing, the layer of stringed fluorinated silica nanoparticles and the layer of SU-8 polymer are entirely separate and discrete layers. At step 460, the stringed fluorinated silica nanoparticle/SU-8 polymer film is baked (partially annealed) at 95° C. for 2 minutes to allow the SU-8 polymer to begin infiltration into the plurality of interstitial voids within the stringed fluorinated silica nanoparticles through capillary rise infiltration (CaRI). The process is stopped before the SU-8 polymer can fully infiltrate into the stringed fluorinated silica nanoparticles layer, preventing the nanoparticles from fully embedding in the SU-8 polymer. This results in an incomplete saturation of the interstitial voids in the nanoparticle film. However, the thickness of the exposed nanoparticle layer is significantly decreased. Because the nanoparticles are stringed, they can partially sink into the SU-8 polymer while exposing the other end of the nanoparticle strings.

Incomplete saturation of a stringed nanoparticle film may be desirable to create higher levels of surface roughness on the PNC film. Because of the incomplete saturation, the exposed ends of the nanoparticle strings create a robust, rough surface on the polymer (e.g. SU-8) layer. This results in a smudge-resistant PNC film, as the rough surface is substantially hydrophobic and oleophobic. The surface roughness can be controlled by the size and shape of the nanoparticle strings, and the morphology of the nanoparticle assembly.

To avoid complete "sagging" of stringed nanoparticles in the polymer binder matrix, which will diminish surface roughness and lead to loss of superhydrophobicity and superoleophobicity, stringed nanoparticles are deposited onto a solid, glassy film of polymer, such as dry SU-8. This avoids the use of liquid monomers. The polymer film can be softened later by baking while the stringed nanoparticles avoid "sagging" during the embedding process.

At step 462, the stringed fluorinated silica nanoparticle/SU-8 PNC film is cured under ultraviolet (UV) light at a dosage of 500 mJ/cm$^2$ to "lock" the stringed fluorinated silica nanoparticle assembly into place as embedded within the SU-8 layer. At step 464, the PNC film is baked a second time to cross-link the SU-8 layer at 120° C. (for PET substrate) or 150° C. (for glass substrate) for 30 minutes to achieve full annealing. Portions of the "locked" nanoparticle strings are still exposed at the surface of SU-8 layer. This results in a superamphiphobic PNC film with a thin layer of loose nanoparticles on the surface of the SU-8 film. Upon removal of the loose nanoparticles at step 466, the film remains superhydrophobic but loses its superoleophobicity. However, it retains its smudge-resistance.

In some aspects, the fluorinated stringed nanoparticle/polymer nanocomposite films include smudge-resistant films having a substrate and, superposed on the substrate, a layer of polymer. Certain PNC films utilize nanoparticles that are stringed. Some stringed nanoparticles comprise silica. Other embodiments include stringed nanoparticles that are at least partially fluorinated.

Figure 5:
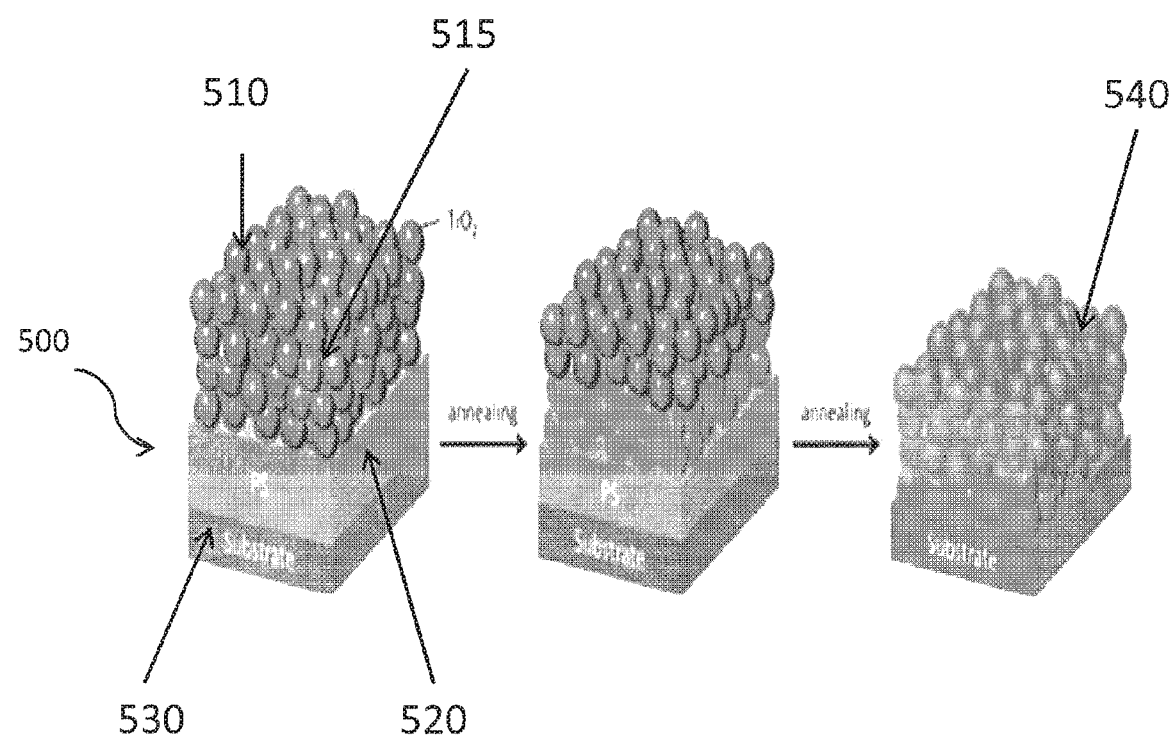
FIG. 5 is a schematic illustration of a method for producing a substantially completely saturated PNC film in accordance with aspects of the present invention.

FIG. 5 depicts steps of process 100 resulting in a substantially complete saturation of the PNC film (i.e., where the interstitial voids of the nanoparticle film are nearly or completely filled with the second layer of material) in accordance with one embodiment. A bilayer film 500 made of a layer of $TiO_2$ nanoparticles 510 and a layer of polystyrene (PS) 520 is deposited onto a substrate 530. The layer of $TiO_2$ nanoparticles 510 includes a plurality of interstitial voids 515. Bilayer film 500 is annealed, and the layer of PS 520 begins to infiltrate the plurality of interstitial voids 515.

The bilayer structure may be annealed at a temperature above the glass transition temperature ($T_g$) of polystyrene in a vacuum oven. The interconnected nanopores in the $TiO_2$ nanoparticle film are filled gradually via CaRI of the polystyrene at this heightened temperature. By reducing the temperature to below the $T_g$ of polystyrene, the infiltrated polystyrene polymer solidifies in the nanopores and a PNC film of polystyrene/$TiO_2$ results.

Figure 6:
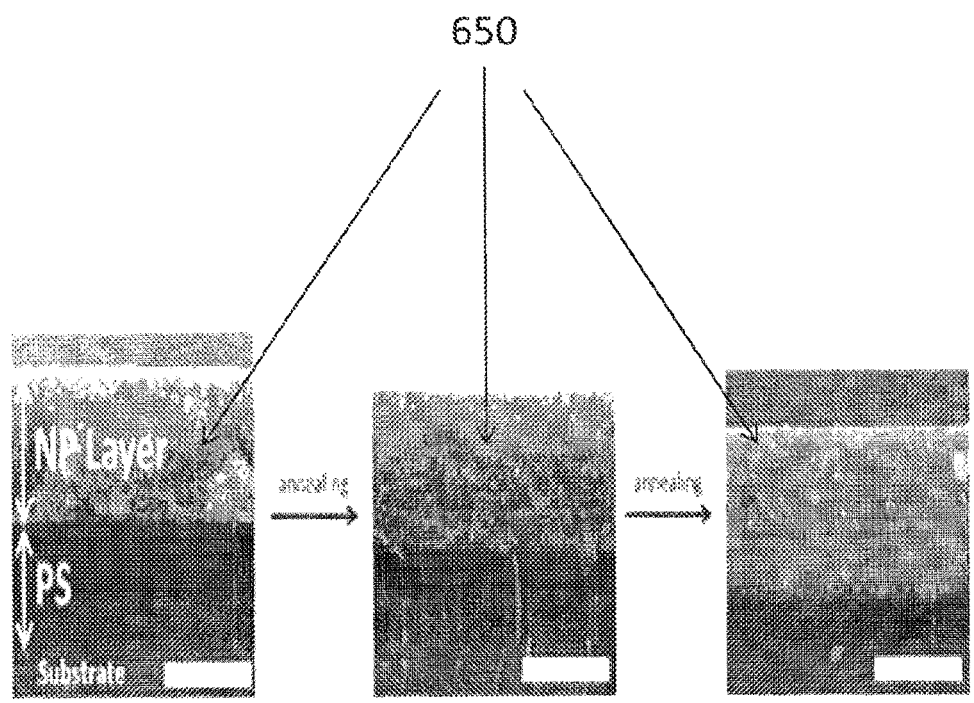
FIG. 6 is a scanning electron microscope (SEM) image of a method for producing a PNC film in accordance with aspects of the present invention.

FIG. 6 depicts the steps of process 100 using scanning electron microscope (SEM) images. The CaRI during the annealing process of a bilayer consisting of polystyrene (PS) and $TiO_2$ nanoparticle layers (NP layer) is shown. The images are taken after the bilayer is annealed at 130° C. for 0, 2, and 20.5 hours, respectively. A clear, darker "front" 650 is of PS "invading" the $TiO_2$ NP layer can be seen during the annealing process.

Figure 7:
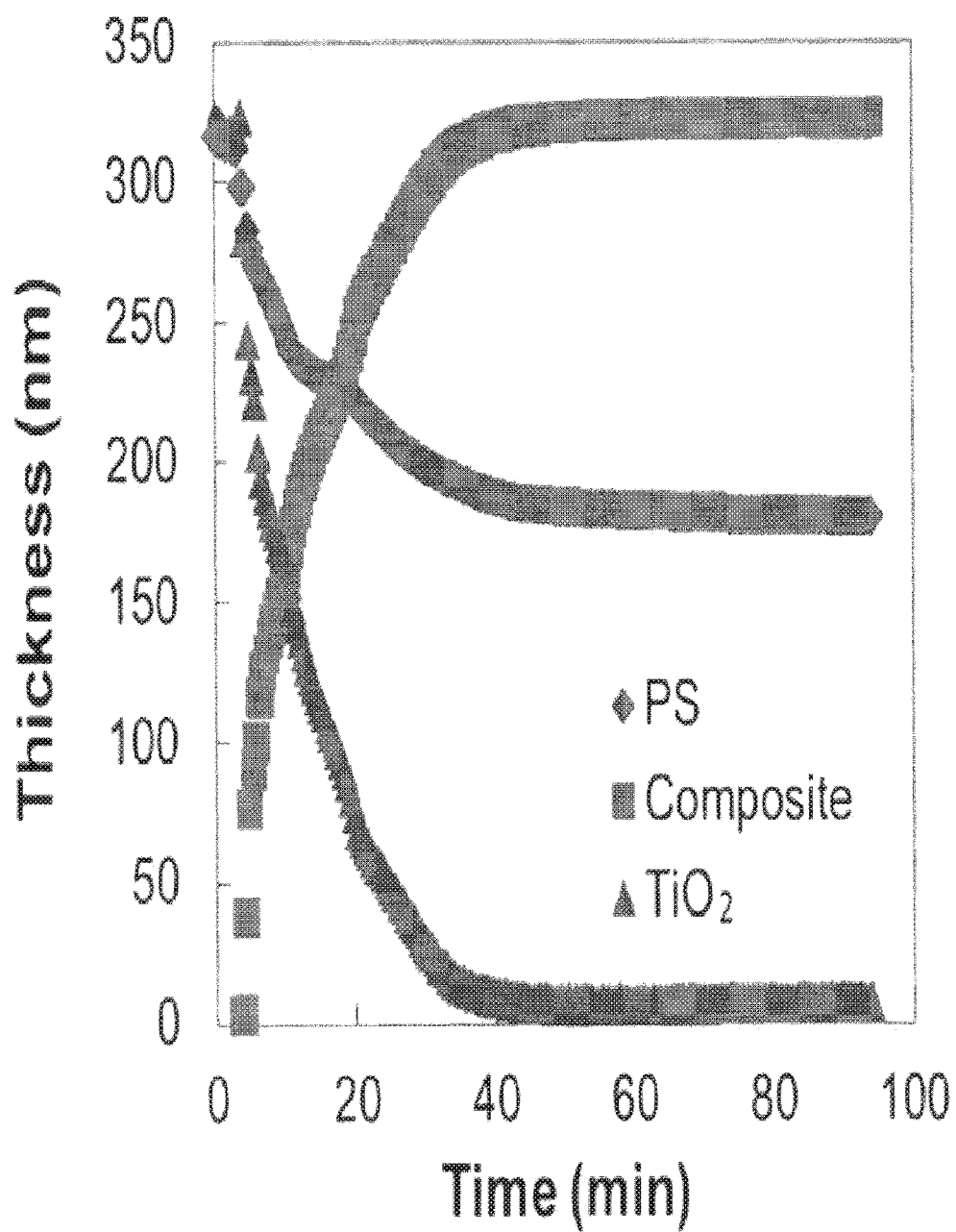
FIG. 7 is a graphical representation of time-dependent changes in the thickness of each layer of a bilayer film upon annealing the bilayer at different temperatures in accordance with aspects of the present invention.

FIG. 7 illustrates the time-dependent changes in the thickness of each layer of a bilayer film composed of 320 nm polystyrene and 320 nm $TiO_2$ nanoparticle layers upon annealing the bilayer at different temperatures. The sample temperature is raised from room temperature at a rate of 30° C./min to a target temperature above the $T_g$ of polystyrene (PS). When the annealing process begins, the thickness of each layer remains unchanged because the temperature is lower than the $T_g$ of polystyrene, which is ~87° C. for polystyrene with a number average molecular weight of $M_n$=8000 g/mol. As the annealing temperature rises above the $T_g$ of polystyrene, the thicknesses of the polystyrene and $TiO_2$ nanoparticle layers begin decreasing, while the thickness of the polystyrene/$TiO_2$ nanocomposite layer begins to increase. This demonstrates that polystyrene is beginning to fill the interstitial voids in the $TiO_2$ nanoparticle layer. The reduction in thickness of the neat polystyrene layer ceases when the when the thickness of the $TiO_2$ nanoparticle layer reaches~0 nm, indicating that the capillary action has completely filled the interconnected nanopores with polystyrene.

Additionally, the sum of the thicknesses of the neat $TiO_2$ nanoparticle layer and polystyrene/$TiO_2$ nanocomposite layer is essentially equal to the initial thickness of the neat $TiO_2$ nanoparticle layer throughout the annealing process. This indicates that the capillary force-driven infiltration of polystyrene into the interstitial voids of the $TiO_2$ nanoparticle layer does not cause any swelling of the nanoparticle layer. Thus, the pack density of the $TiO_2$ nanoparticles after annealing likely remains unchanged from the original neat $TiO_2$ nanoparticle layer.

Figure 8:
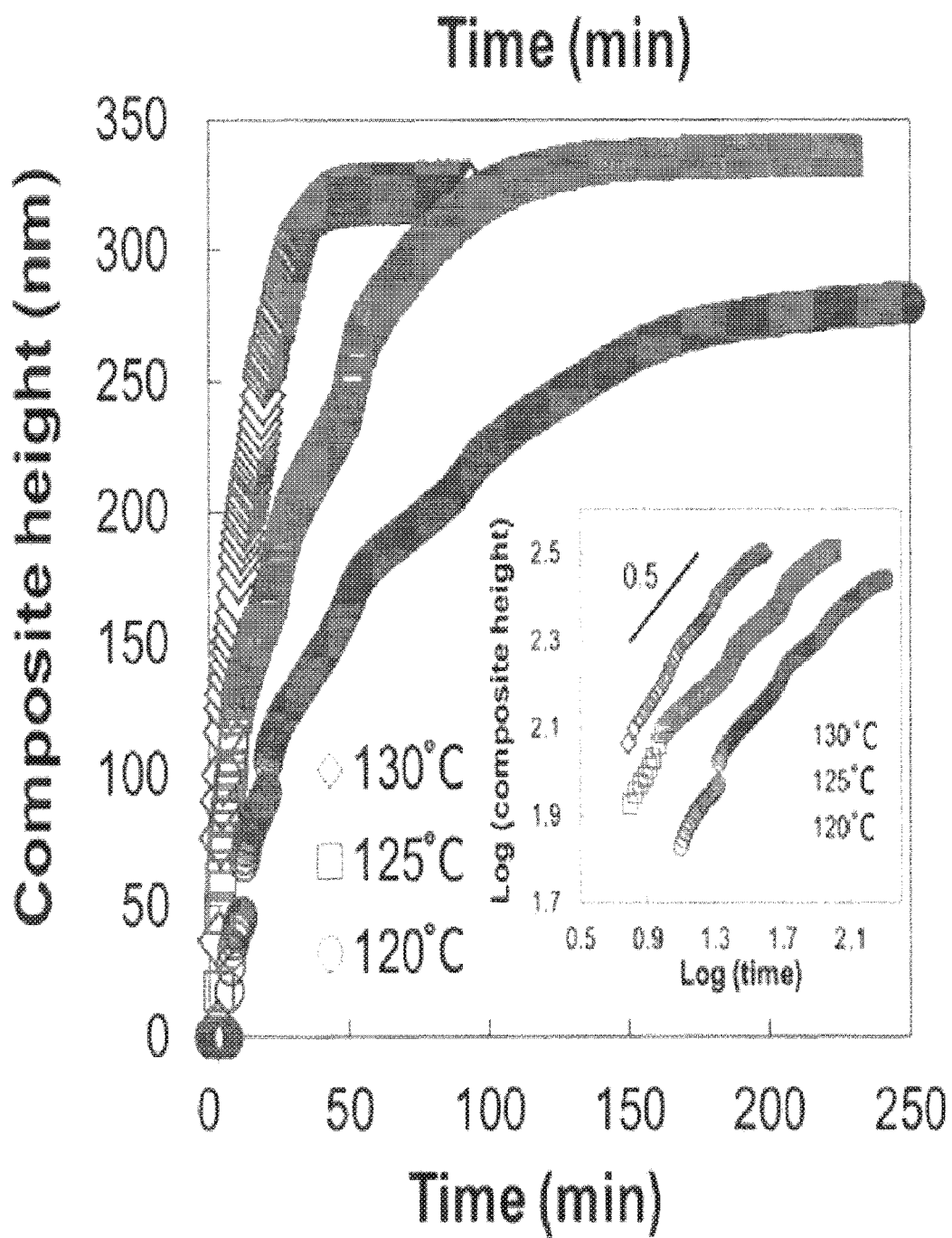
FIG. 8 is a graphical representation of a time-dependent change in height of composite layers at different annealing temperatures in accordance with aspects of the present invention.

FIG. 8 depicts a time-dependent change in height of composite layers at different annealing temperatures. The viscosity of polystyrene is sensitively dependent upon the temperature above $T_g$, and viscosity of fluid is known to have significant impact on the capillary action of fluids. The initial thicknesses of the $TiO_2$ layers depicted in FIG. 8 are 320 nm, 335 nm, and 280 nm, and the annealing temperatures for each $TiO_2$ layer are 130° C., 125° C., and 120° C., respectively. As the annealing temperature is increased above $T_g$, the CaRI of the polystyrene is accelerated significantly. The plotted curves indicate that the behavior of the liquid PS is consistent with the behavior of common liquids undergoing capillary rise into porous media, such as the $TiO_2$ layer. At the highest temperature, 130° C., the height of the composite polystyrene/$TiO_2$ layer increases the fastest over time, indicating a faster capillary rise at higher temperatures above $T_g$. At the lower temperatures, 125° C. and 120° C., the capillary rise action still occurs, but at successively slower rates.

FIGS. 9A through 9d depict cross-sectional SEM images of PNC films generated by CaRI of polystyrene into ellipsoidal anisotropic $TiO_2$ nanoparticle layers having different aspect ratios. The $TiO_2$ nanoparticle films depicted in FIGS. 9A through 9d have aspect ratios (AR) of around 1, 2, 4, and 6, respectively. The films are referred to as AR1, AR2, AR4, and AR6, respectively. The $TiO_2$ ellipsoid nanoparticles are densely packed and randomly oriented from a spin coating process. The SEM images illustrate that polystyrene can infiltrate into the nanopores of these $TiO_2$ layers made with densely-packed ellipsoidal nanoparticles, yet a small residual layer of polystyrene remains in each annealed film. This remained the case even in instances where the samples were annealed for a long period of time (e.g. more than one week) at high temperatures (i.e. 130° C.), which indicated that the interstitial voids within the nanoparticle layers had been completely filled via CaRI.

FIG. 9A depicts AR1, a $TiO_2$ nanoparticle layer film having a volume fraction of 62.8±0.4. FIG. 9B depicts AR2, a $TiO_2$ nanoparticle layer having a volume fraction of 64.9±0.1 (the highest volume fraction of the examples). FIG. 9C depicts AR4, a $TiO_2$ nanoparticle layer having a volume fraction of 58.4±0.1. FIG. 9D depicts AR6, a $TiO_2$ nanoparticle layer having a volume fraction of 41.6±0.4 (the lowest volume fraction of the examples). Each image illustrates that CaRI of polystyrene can result in densely packed PNC films having high volume fractions of nanoparticles. Furthermore, the results indicate that changing the shape of the nanoparticles used (e.g. as ellipsoid or spherical particles) may control the volume fraction of the nanoparticles in the resulting PNC films.

Figure 10A:
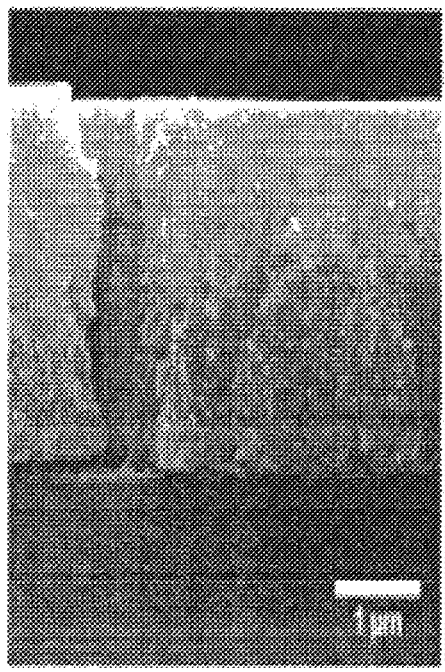
FIGS. 10A and 10B depict cross-sectional SEM images of PNC films before and after annealing with polystyrene in accordance with aspects of the present invention.
Figure 10B:
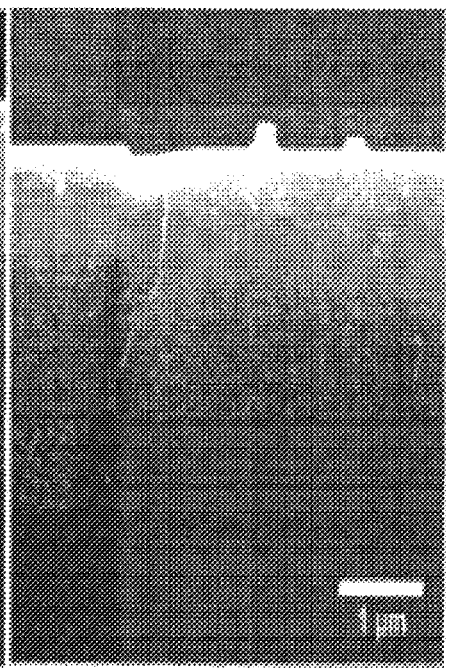

FIGS. 10A and 10B illustrate cross-sectional SEM images of PNC films before and after annealing with polystyrene, respectively. Cracks in nanoparticle layers are undesirable features for the practical applications of PNC films, which may reduce the transport, optical properties, and mechanical properties of the films. During the annealing process, CaRI of polystyrene causes the polystyrene to infiltrate into pre-existing cracks present in the nanoparticle layer. The infiltrating PS closes the cracks, which may "heal" the defects in the nanoparticle layers. Such a "healing" process may be another benefit of CaRI in generating PNC films with high volume fractions of nanomaterials.

Figure 10C:
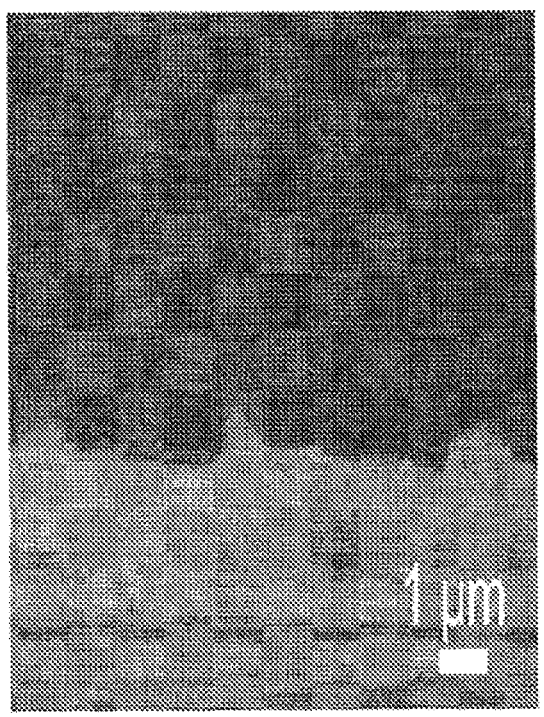

FIG. 10C illustrates a cross-sectional SEM image of a bilayer film comprising stringed nanoparticles spray coated onto a dry SU-8 film layer. The thickness of the nanoparticle layer is 3-4 µm with little embedding of the stringed nanoparticles in the SU-8. The SU-8 film layer has a thickness of ~2 µm.

Figure 10D:
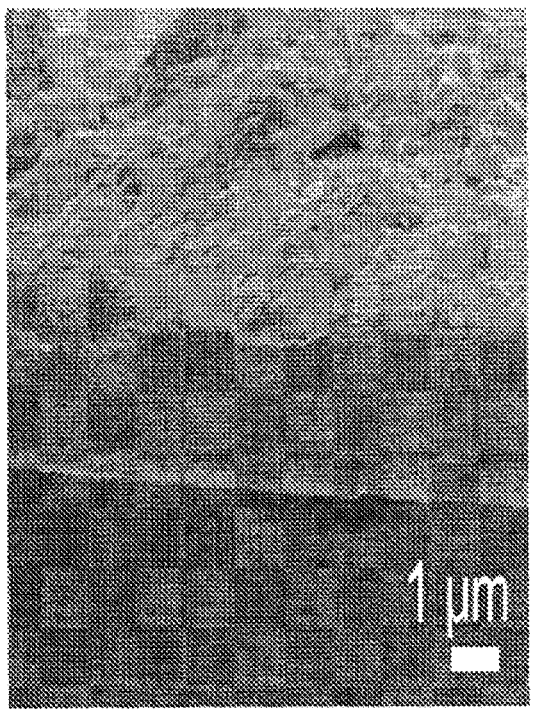

FIG. 10D illustrates a cross-sectional SEM image of the SU-8 polymer partially infiltrating into the stringed nanoparticle layer and the nanoparticle layer partially embedding into the SU-8 polymer during a soft bake heating at 95° C. for 2 minutes. The thickness of the exposed stringed nanoparticle layer is significantly reduced.

FIGS. 10E and 10f illustrates a cross-sectional SEM image of a stringed nanoparticle/SU-8 PNC film following UV exposure and hard baking at 120° C. (for PET substrate) or 150° C. (for glass substrate) at 30 minutes to cross-link SU-8 polymer. While portions of the stringed nanoparticles are embedded in the SU-8 layer, other ends are exposed, making the film more robust. FIG. 10E depicts a thin layer of loose nanoparticles on the surface of the SU-8 layer easily removed by rubbing with fingers. Before removing the loose nanoparticles, the PNC film is superamphiphobic. FIG. 10F depicts the PNC film after removal of the loose nanoparticles, resulting in a PNC film that is not superamphiphobic, but smudge-resistant and superhydrophobic.

Figure 11A:
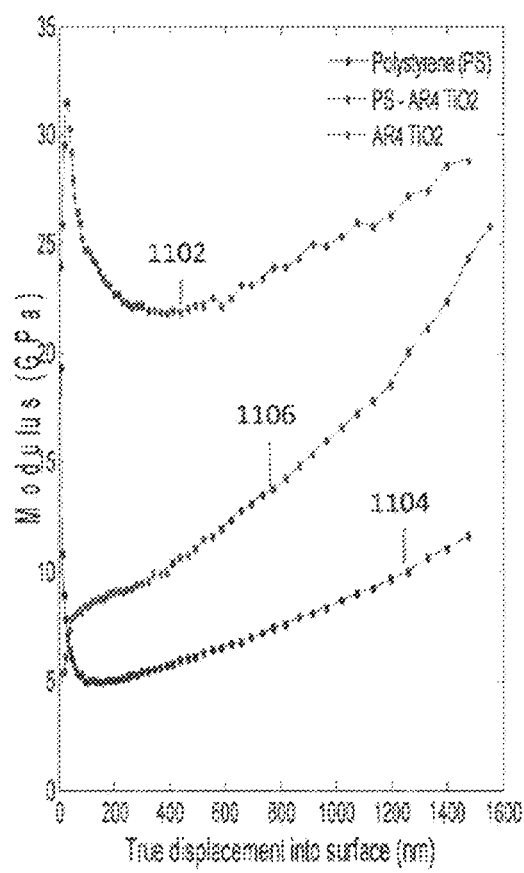
FIGS. 11A and 11B depict graphical representations of the modulus and hardness, respectively, of completely saturated PNC films in accordance with aspects of the present invention.
Figure 11B:
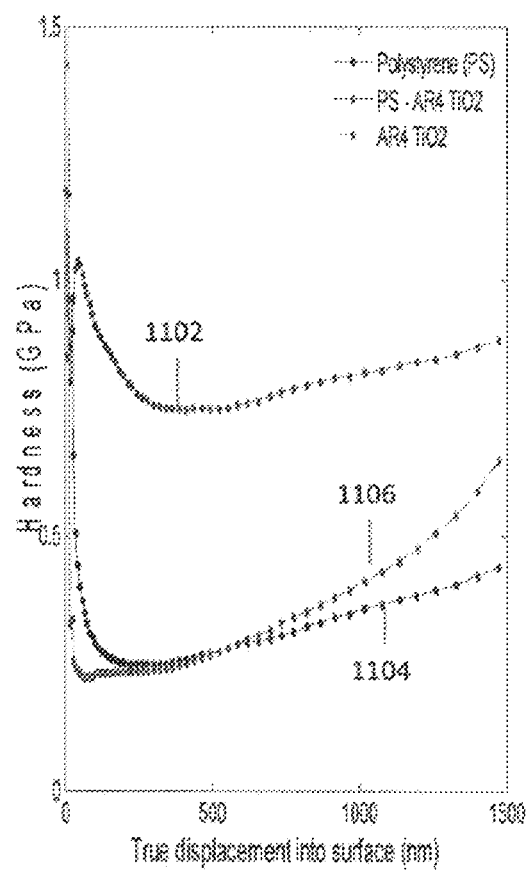

FIGS. 11A and 11B depict the enhanced mechanical properties, including modulus and hardness, respectively, of a completely saturated PNC film comprised of $TiO_2$ nanoparticles and polystyrene vs. individual neat layers of $TiO_2$ and polystyrene. The polystyrene/$TiO_2$ nanoparticle PNC film is represented by line 1102. The neat layer of polystyrene (PS) is represented by line 1104. The neat layer of $TiO_2$ is represented by line 1106.

Figure 12A:
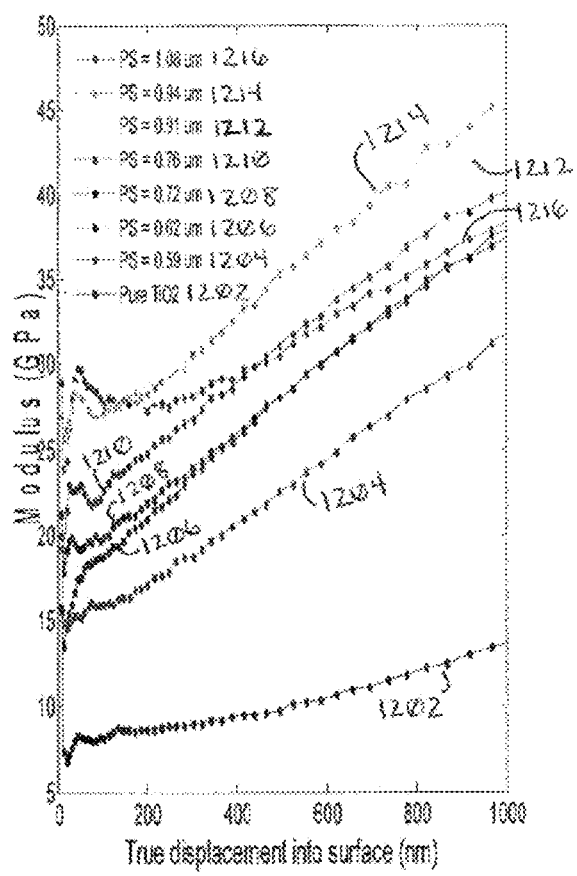
FIGS. 12A and 12B depict graphical representations of the modulus and hardness, respectively, of various incompletely saturated PNC films in accordance with aspects of the present invention.
Figure 12B:
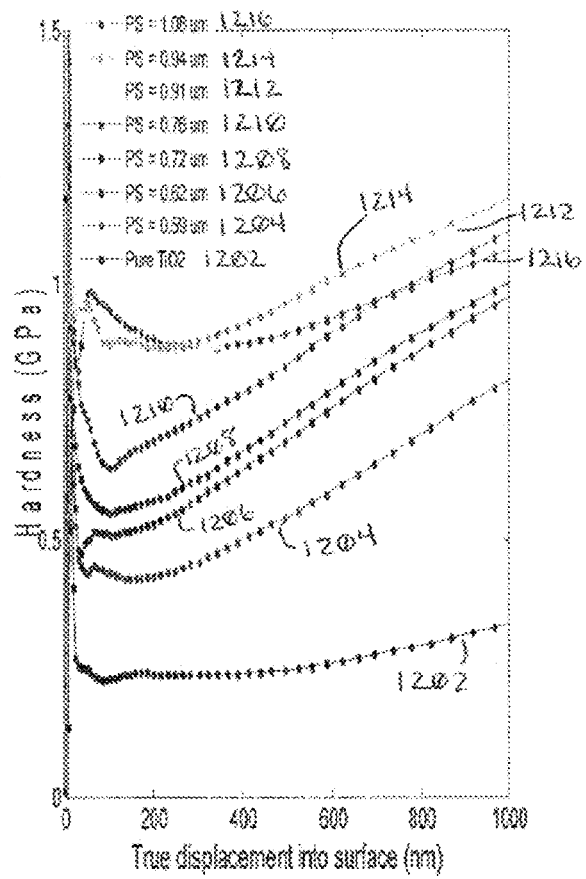

As shown by FIGS. 12A and 12B, the incompletely saturated PNC film has enhanced mechanical properties, including modulus and hardness, respectively, of a PNC film comprised of $TiO_2$ nanoparticles and polystyrene vs. an individual layer of $TiO_2$. The individual neat layer of $TiO_2$ is represented by line 1202 for both modulus and hardness, respectively. Incompletely saturated polystyrene/TiO2 nanoparticle PNC films having different thicknesses of polystyrene layers, from 0.59 μm thickness to 1.08 μm thickness. These incompletely saturated polystyrene/TiO2 PNC films with different polystyrene thicknesses are represented by line 1204 (i.e. 0.59 μm polystyrene thickness) through line 1216 (i.e. 1.08 μm polystyrene thickness), inclusively.

Figures 13A, 13B:
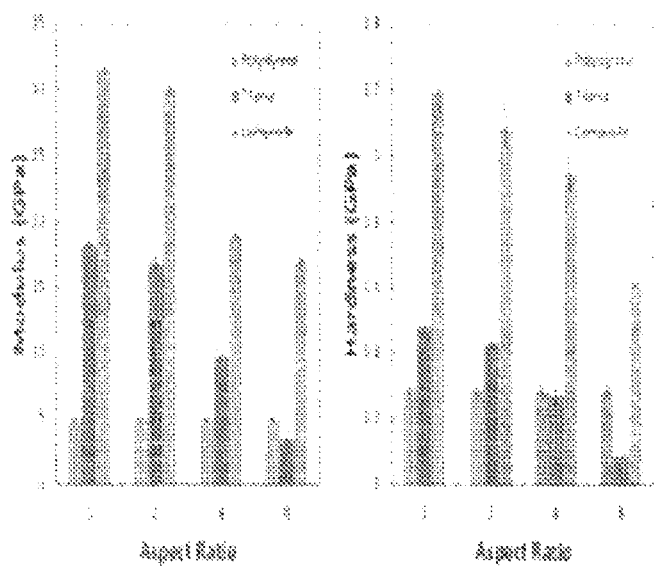
FIGS. 13A and 13B are graphical representations of the modulus and hardness, respectively, of PNC films having different aspect ratios in accordance with aspects of the present invention.

FIGS. 13A and 13B illustrate the mechanical properties of modulus and hardness in the four films depicted in FIGS. 9A through 9D: AR1, AR2, AR4, and AR6, respectively. PNC films generated through CaRI may be expected to have high modulus and hardness in addition to excellent damage tolerance. The mechanical properties of composite PNC films AR1, AR2, AR4, and AR6 are compared with the mechanical properties of their corresponding neat $TiO_2$ nanoparticle layers (Titania) and polystyrene layers using nanoindentation. In both FIGS. 13A and 13B, the mechanical properties (i.e. modulus and hardness) of the composite PNC films are significantly higher than those of neat $TiO_2$ nanoparticle and neat polystyrene films. Furthermore, the modulus and hardness of the PNC films with different aspect ratios, AR1, AR2, AR4, and AR6, indicate that specific nanostructure used has a significant impact on the mechanical properties of the resulting composite. The polystyrene/AR1 $TiO_2$ nanoparticle PNC film demonstrated the highest modulus and hardness values.

Figure 14A:
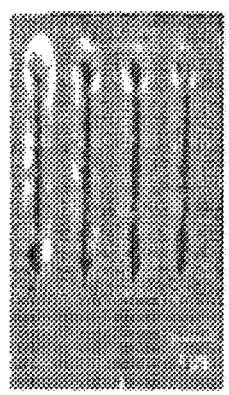
FIGS. 14A through 14C depict plan-view images of different film types after nanoindenter scratch tests in accordance with aspects of the present invention.
Figure 14B:
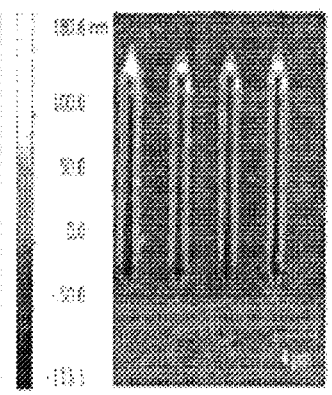
Figure 14C:
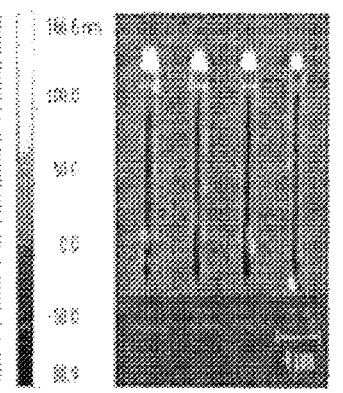

FIGS. 14A through 14C depict the results of nanoindenter scratch tests in different films, with each test employing four scratches made under the same loading condition (i.e. 500 μN normal load). FIG. 14A depicts a pure polystyrene film. FIG. 14B depicts a pure AR1 $TiO_2$ film. FIG. 14C depicts a polystyrene/AR1 $TiO_2$ PNC film. The average scratch depth for the pure polystyrene film was 54.6 nm±12.5 nm, while the average scratch depth for the pure AR1 $TiO_2$ film was 45.1 nm±6.9 nm. The polystyrene/$TiO_2$ PNC film displayed the shallowest scratch depth at 38.6 nm±6.6 nm, demonstrating better scratch resistance compared to both neat $TiO_2$ nanoparticle film and neat polystyrene film.

Lateral force per area is a measure of the stress required to deform and displace the material during a scratch. Measured lateral force is normalized by the cross-sectional area of the scratch. The average lateral force per area for the neat polystyrene film depicted in FIG. 14A was 20 $nN/nm^2$±7.6 $nN/nm^2$, and the average lateral force per area for the neat AR1 $TiO_2$ film was 26 $nN/nm^2$±7.3 $nN/nm^2$. The polystyrene/$TiO_2$ film demonstrated the highest average lateral force per area at 31 $nN/nm^2$±8.2$nN/nm^2$, suggesting that the PNC film resulting from CaRI has better mechanical properties than both the neat polystyrene and neat nanoparticle films.

In another embodiment, a uniform PNC film includes a plurality of nanoparticles dispersed in a polymer matrix, wherein the plurality of nanoparticles form at least 60% by volume of the PNC film.

In still another embodiment, a nanocomposite film is provided. The nanocomposite film may be obtained from the inventive methods described herein.

In yet another embodiment, a method for producing a composite film is provided. The method includes generating a bilayer film including at least a first layer of at least one particle and a second layer of at least one material, the at least one particle selected from the group consisting of micron particles, millimeter particles, and nanoparticles, and annealing the bilayer film.

The nanocomposite films described herein have many uses. In particular, the processes disclosed herein permit the production of surfaces of nanoparticles that are robust and have structural stability while maintaining their functional properties, i.e., electrical, optical, magnetic, plasmonic, transport. The inventive nanocomposite films may also be used to reinforce other types of nanoparticle-films (e.g., anti-fogging and anti-reflection coatings). Further, the inventive nanocomposite films have particular application in fracking wastewater treatment. In a typical membrane, there is a trade-off between selectivity and permeability. Thus a membrane that can effectively separate heavy ions in fracking wastewater typically will have low permeability. A membrane that has both high selectivity and permeability can be generated by adding nanoparticles to a polymer membrane, but it is critical to create membrane with fully percolating network of nanoparticles. Conventional methods that use mixing polymers and nanoparticles cannot easily generate membranes with percolated network of nanoparticles. The disclosed invention enables the generation of such membrane structure.

EXAMPLES

The following examples are included to demonstrate the overall nature of the present invention. The examples further illustrate the improved results obtained by employing the amphiphilic particles and related processes.

Example 1

Generation of a Completely Saturated Polystyrene—$TiO_2$ Nanocomposite Film

Bilayer samples are prepared by depositing a polystyrene film on a silicon wafer via spin coating and subsequently depositing $TiO_2$ nanoparticles on top of the polystyrene (PS) film again using spin coating. Because toluene and water are used as solvents for PS and $TiO_2$ nanoparticles, respectively, the sequential coating does not damage the PS layer. The thickness of each layer can be precisely controlled by changing the concentration of the polymer/nanoparticle solution or the rpm. Typical samples consists of 3 μm PS and 3 μm TiO$_2$ nanoparticle films. The samples are then annealed at above glass transition temperature (100° C.) of PS under vacuum.

Turning to FIGS. 15A through 15F, the bilayer of TiO$_2$ nanoellipsoids (aspect ratio=4) and polystyrene (PS) (MW=8 k) was annealed at 130° C. While the thickness of the PS layer becomes smaller during annealing, that of the nanoparticle film remains constant, indicating that PS infiltrates the nanoparticle layer, whereas no TiO$_2$ nanoparticles infiltrate the PS layer. By tracking the thickness of the residual PS film, the amount of polymer that has infiltrated the nanoparticle film can be estimated (FIG. 15E, FIG. 15F). After 4 hours, as shown in FIG. 15C, the infiltration process ceased, indicating that the interstitial voids in the nanoparticle film were completely filled by the polymer. The porosity of the nanoparticle film estimated based on the amount of polymer infiltrated was consistent with the porosity measured using gravimetric analysis, again suggesting that complete infiltration has been achieved. FIG. 15D shows a sharp rising front that develops during the annealing process. Surprisingly, the amount of PS that has infiltrated the nanoparticle film as a function of time shows dynamics that is not consistent with the Lucas-Washburn model (dashed circle in FIG. 15F). In fact, at "short times" (<1.5 hr), the infiltration rate accelerates which resembles the "very short time" (~10-3 sec) behavior predicted by Eq 1 during the capillary rise of water in bead packings as shown in FIGS. 15E and 15F.

$$\left(h + \frac{7}{6}R\right)\frac{d^2h}{dt^2} + 1.225\left(\frac{dh}{dt}\right)^2 + C_1 h \frac{dh}{dt} = \frac{1}{\rho}[\Delta P - \rho g h] \quad (1)$$

where $C_1 = \frac{8\mu}{\rho R^2}, \Delta P = \frac{2\sigma \cos\theta}{R}$.

Preliminary results demonstrate that 1) polymer infiltration into nanoparticle packings is a simple and robust method to generate nanocomposite films with high volume fractions of nanoparticles (even using a highly anisotropic nanoparticle) and, more interestingly, 2) the dynamics of infiltration deviates from the Lucas-Washburn model.

Example 2

Characterization of Infiltration into a Nanocomposite Film

Figure 16:
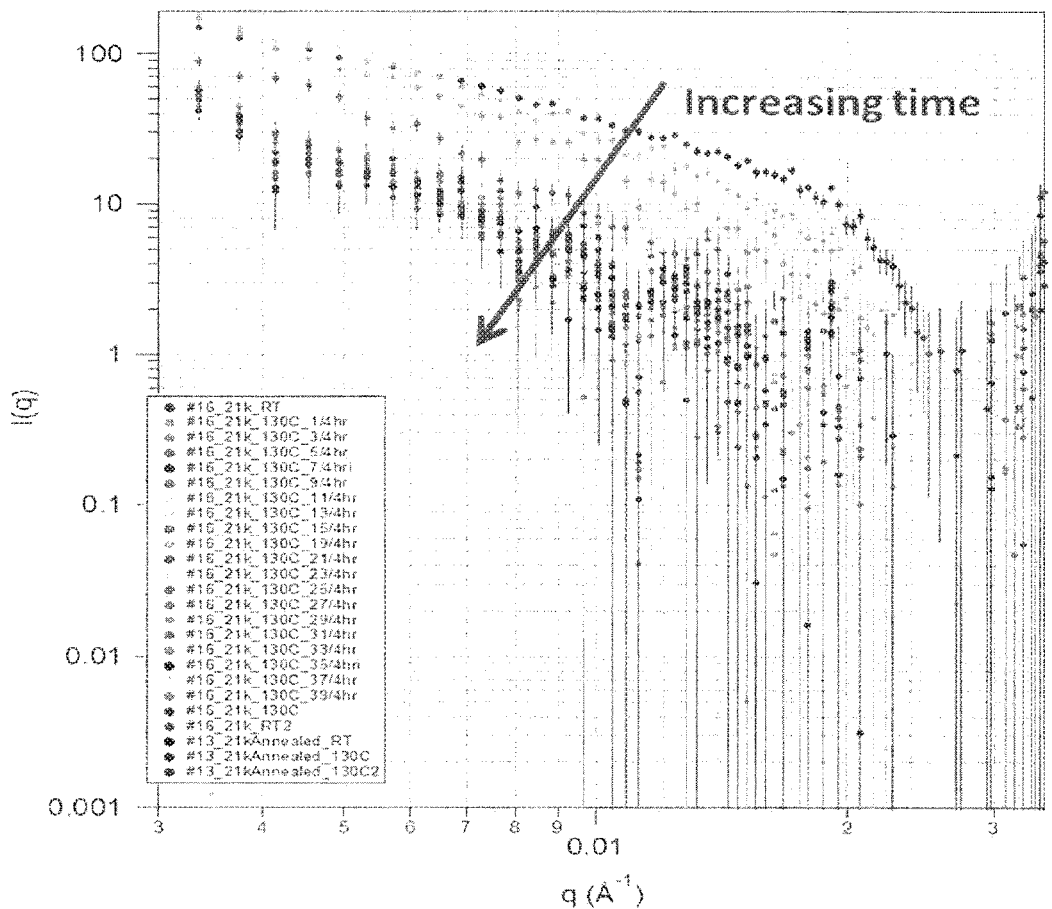
FIG. 16 is a graphical representation of in situ SANS of $TiO_2$ nanoellipsoid/polystyrene film undergoing polymer infiltration at 130° C. in accordance with aspects of the present invention.

For a two phase system, the scattering intensity of SANS may be described by $I(Q) \approx \varphi(\Delta\rho)^2 P(Q) S(Q)$ (where φ is the volume fraction, Δρ is the contrast between the media in the interstitial space and the colloidal particles, P(Q) and S(Q) are form factor and inter-particle structure factor, respectively). Before polymer infiltration, the contrast would be between TiO$_2$ particles and vacuum in the interstices of the nanoparticle network. Upon the complete filling of the interstitial pores, the contrast would be between TiO$_2$ and polymers. The scattering length density (SLD) of PS and TiO2 is about 1.4×10−6 Å−2 and 2.6×10−6 Å−2, respectively. Therefore, scattering intensity after the complete infiltration of polymer into the nanoparticle layer is a small fraction of the intensity before the polymer infiltration. This large change in the intensity of the scattering patterns, as shown in FIG. 16, makes SANS a very sensitive tool to study the kinetics of polymer infiltration.

Once the particle layer is partially filled with polymers, the structure becomes a three-phase system. If the polymer infiltrates the nanoparticle film with a uniform front, the analysis will be straightforward because the scattering intensity will be the sum of the scattering from the layer filled with polymers and the rest of the layer without any polymers, i.e., I(Q)=Ifilled(Q)+Inon-filled(Q). The SLD of PS and TiO$_2$ nanoparticle can be experimentally determined. Thus, the only unknown variable will be the volume fraction of the particle layers. If the polymer infiltration is dominated by diffusion, the invariance calculation based on three phase systems may be used to extract the volume fraction of polymers filled in the particle layer. Based on these approaches, the time dependent function of the volume fraction of filled polymer inside the nanoparticle layer can be extracted.

The most challenging characterization may be in the case of Pe<O(1); that is, when the polymer infiltration is dominated by diffusion. RBS enables depth profiling of PNC films with resolution of 10-20 nm25. To minimize radiation damage of PS, the total charge may be kept low, around 4 μC, and accumulated in 0.5 μC increments on fresh areas. A software package RUMP may be used to simulate RBS spectra and convert energy to depth. Simulations will performed by dividing the nanoparticle film into 5-10 sublayers of different atomic compositions and thickness values. By adjusting the thickness and volume fractions of each sublayer, we compared the simulation to the experimental data until a good fit is achieved.

Example 3

Mechanical Property Analysis of a Nanocomposite Film

FIGS. 17A and 17B respectively show the results of wear tests for pure TiO$_2$ particles (no polystyrene) and a PNC film of TiO$_2$ and polystyrene. Test conditions included wear tests under 500 nN and 4 μm/s within an area of 500×500 nm$^2$. After 1 wear scan, the pure TiO$_2$ sample displayed a height loss of 4.33+/−1.13 nm, while the PNC film displayed a height loss of 3.09+/−0.4 nm. After 5 wear scans, the no polystyrene sample displayed a height loss of 7.3+/−1.91 nm, while the PNC film displayed a height loss of 6.23+/−1.09 nm.

Turning next to FIGS. 18A-18C, the results of scratch tests are shown for pure TiO$_2$ particles (sample No. 1, without polystyrene, FIG. 18A and line 1802 in FIG. 18C) and a PNC film of TiO$_2$ and polystyrene (sample No. 2, FIG. 18B and line 1804 in FIG. 18C). Test conditions included scratch tests under 500 nN and 4 μm/s along 1.5 μm horizontal lines. The pure TiO$_2$ sample displayed an average lateral force of 38.2+/−5.6 mV and an average depth of 6.91+/−0.73 nm. The PNC film displayed an average lateral force of 43.8+/−5.1 mV and an average depth of 5.14+/−1.24 nm.

Figures 19A, 19B:
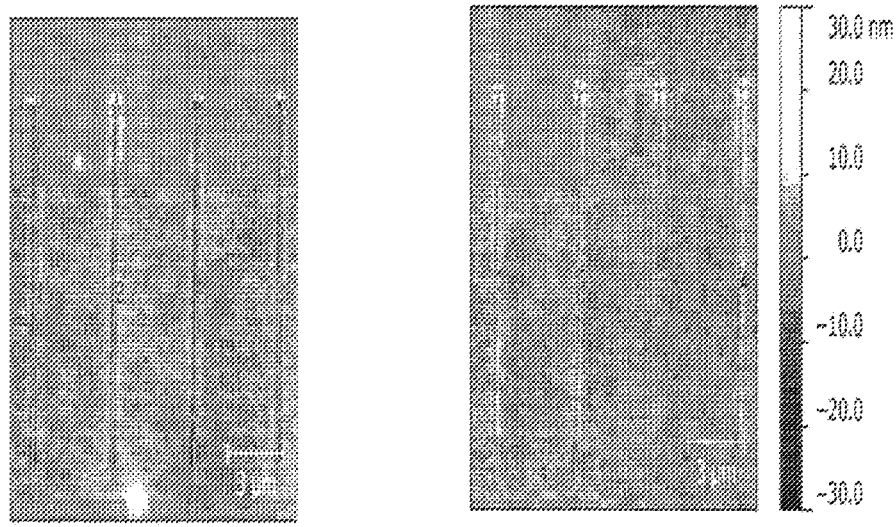
FIG. 19A is an SEM image of a $TiO_2$ nanoellipsoid film undergoing nanoindenter scratch testing.
FIG. 19B is an SEM image of a $TiO_2$ nanoellipsoid/polystyrene PNC film in accordance with aspects of the present invention undergoing nanoindenter scratch testing.
Figure 19C:
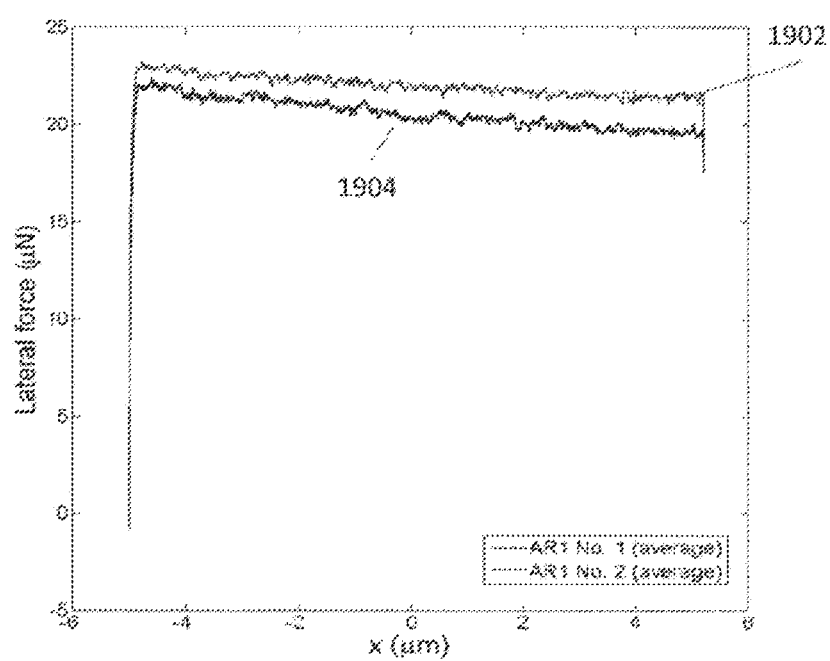
FIG. 19C is a graphical representation of the results of nanoindenter scratch testing of a $TiO_2$ nanoellipsoid film and a $TiO_2$ nanoellipsoid/polystyrene PNC film in accordance with aspects of the present invention.

The results of nanoindenter scratch tests for pure TiO$_2$ particles (sample No. 1, without polystyrene, FIG. 19A and line 1902 in FIG. 19C) and a PNC film of TiO$_2$ and polystyrene (sample No. 2, FIG. 19B and line 1904 in FIG. 19C) are displayed in FIGS. 19a-19c. Test conditions included scratch tests under 50 μN and 4 μm/s along 10 μm lines. The pure TiO$_2$ sample displayed an average lateral force of 21.8+/−1.87 mN and an average depth of 11.3+/−

2.85 nm. The PNC film displayed an average lateral force of 20.4+/−1.77 mN and an average depth of 4.8+/−2.42 nm.

Figure 20A:
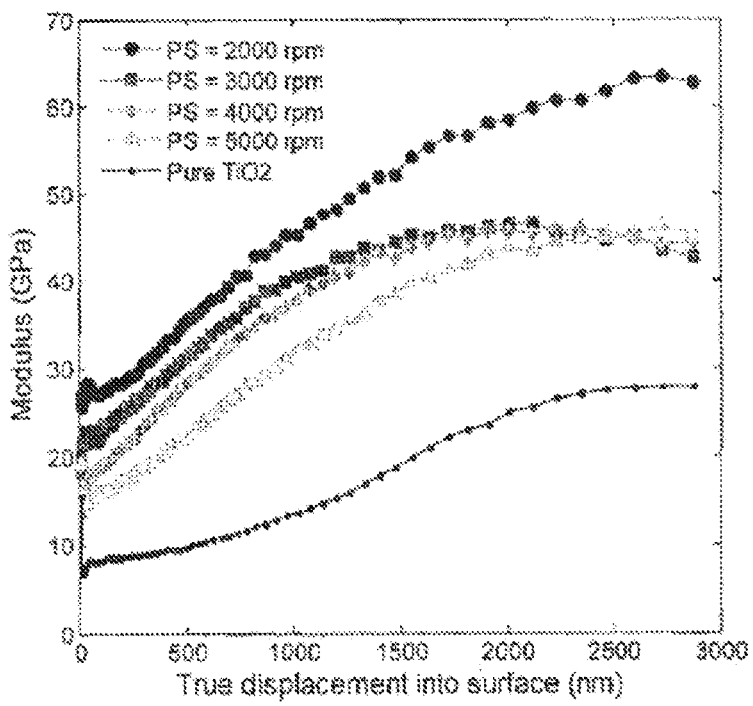
FIG. 20A is a graphical representation of the modulus of various PNC films containing various amounts of polystyrene in accordance with aspects of the present invention.
Figure 20B:
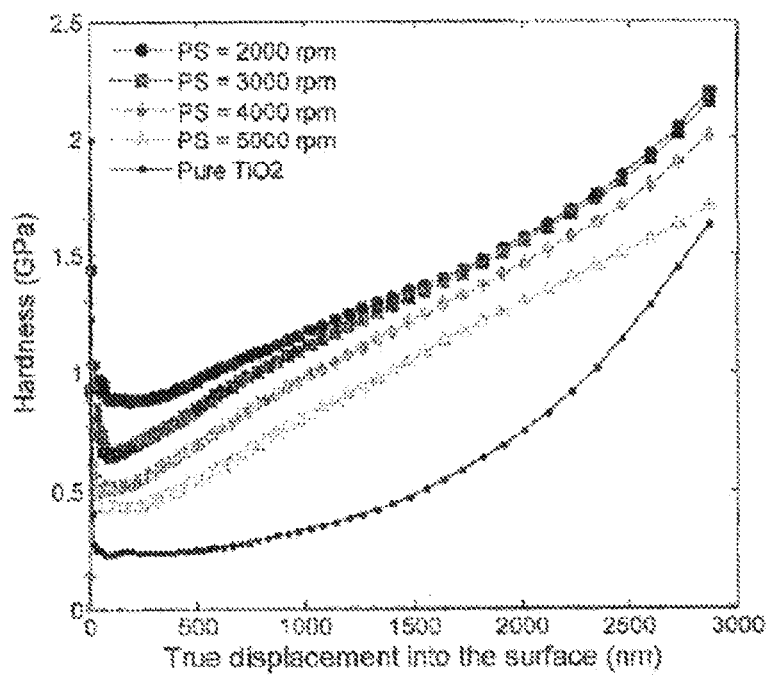
FIG. 20B is a graphical representation of the hardness of various PNC films containing various amounts of polystyrene in accordance with aspects of the present invention.

FIGS. 20A and 20B respectively display modulus and hardness properties for pure $TiO_2$ particles and nanocomposite films having a variety of polystyrene (PS) concentrations.

Example 4

Oleophobic and Smudge-Resistance Property Analysis of a Nanocomposite Film

Figure 21A:
FIGS. 21A through 21D are images demonstrating the smudge-resistant and oleophobic properties of a stringed nanoparticle/SU-8 PNC film on both PET and glass substrates.
Figure 21B:
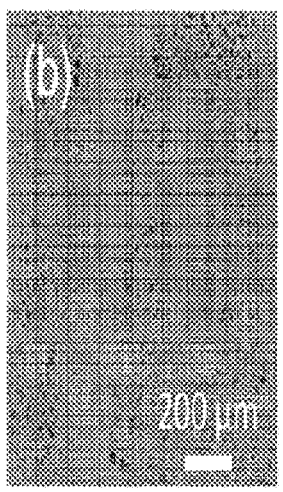
Figure 21C:
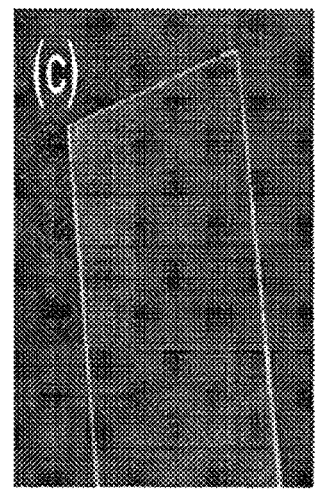

FIGS. 21A through 21D depict the results of fingerprint tests and sweat-coating tests demonstrating the smudge-resistant and oleophobic capabilities of a stringed nanoparticle/SU-8 PNC film on glass substrates as compared to bare glass. FIGS. 21A and 21C respectively show the results of fingerprint tests on bare glass and stringed nanoparticle/SU-8 coated glass. The bare glass depicted in FIG. 21A has a clear fingerprint, while the nanoparticle/SU-8 coated glass displayed a much smaller and less visible fingerprint trace.

Figure 21D:
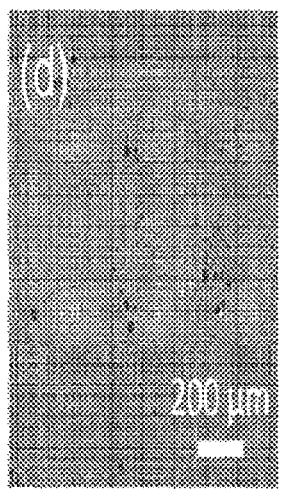

FIGS. 21B and 21D respectively demonstrate the results of swiping sweat on bare glass and stringed nanoparticle/SU-8 coated glass. Sweat usually contains water, fat, and salt. Swiping sweat on the nanoparticle/SU-8 coated glass left trace oil droplets on small areas as depicted by FIG. 21D. On the bare glass, however, oil droplets from the sweat were dispersed everywhere as shown in FIG. 21B. It is believed, without adherence to a particular theory, that the sweat is unable to wet well on the nanoparticle/SU-8 coated glass, forming large droplets instead to lower the surface energy. This formation of large droplets is believed to decrease the sweat covering area, reducing the traces of both sweat and fingerprints.

Although the invention is illustrated and described herein with reference to specific embodiments, the invention is not intended to be limited to the details shown. Rather, various modifications may be made in the details within the scope and range of equivalents of the claims and without departing from the invention:

What is claimed:

1. A method of producing a nanocomposite film, comprising:
   annealing a bilayer film that comprises (i) a first layer comprising a plurality of nanoparticles having a close pack density, the first layer comprising a plurality of interstitial voids and (ii) a second layer comprising polymeric material,
   the annealing being performed such that at least a portion of the polymeric material of the second layer infiltrates the plurality of interstitial voids of the first layer so as to give rise to a nanocomposite film defining a thickness and comprising:
   a plurality of the nanoparticles dispersed in a matrix of the polymeric material,
   the nanocomposite film having therein a layer of interlocked and jammed nanoparticles present at or at about the close pack density of the nanoparticles.

2. The method of claim 1, wherein the plurality of interstitial voids are not completely infiltrated by the at least a portion of the polymeric material.

3. The method of claim 2, wherein the plurality of nanoparticles comprises stringed nanoparticles.

4. The method of claim 3, wherein the stringed nanoparticles are silica nanoparticles.

5. The method of claim 4, wherein the silica nanoparticles are fluorinated.

6. The method of claim 2, wherein the polymeric material comprises SU-8 polymer.

7. The method of claim 3, wherein the annealing comprises: baking the bilayer film to partially embed the stringed nanoparticles within the second layer comprising polymeric material so as to form an embedded layer; curing the embedded layer with an ultraviolet light source; and baking the bilayer film a second time.

8. The method of claim 1, wherein the annealing comprises at least one of solvent annealing or thermal annealing.

9. The method of claim 8, wherein the polymeric material is an amorphous material having a glass transition temperature, and the annealing comprises heating the bilayer film above the glass transition temperature of the amorphous material.

10. The method of claim 1, wherein the plurality of interstitial voids are completely infiltrated by the polymeric material.

11. The method of claim 1, wherein the polymeric material is an amorphous material selected from the group consisting of polystyrene, polymethylmethacrylate, polysulfone, polyetherimide, polyvinyl chloride, and polycarbonate.

12. The method of claim 1, wherein the polymeric material is a crystalline or semi-crystalline material selected from the group consisting of polyethylene, polypropylene, nylon, and polyethyleneterephthalate.

13. The method of claim 1, wherein the nanoparticles are selected from the group consisting of oxide nanoparticles, metal nanoparticles, semiconductor nanoparticles, catalytic nanoparticles, and magnetic nanoparticles.

14. The method of claim 1, wherein the plurality of nanoparticles comprises oxide nanoparticles and the polymeric material is polystyrene having a glass transition temperature, and wherein the annealing comprises heating the bilayer film above the glass transition temperature of the polystyrene.

15. A nanocomposite film, the nanocomposite film defining a thickness and the nanocomposite film comprising:
   a plurality of nanoparticles dispersed in a polymer matrix, the nanoparticles having a close pack density, and
   wherein the nanocomposite film defines therein a layer of interlocked and jammed nanoparticles present at or at about the close pack density of the nanoparticles.

16. The nanocomposite film of claim 15, wherein the nanocomposite film defines a plurality of interstitial voids between nanoparticles, which interstitial voids are not completely infiltrated by the polymer matrix.

17. The nanocomposite film of claim 15, wherein the nanocomposite film defines a plurality of interstitial voids between nanoparticles, which interstitial voids are completely infiltrated by the polymer matrix.

18. The nanocomposite film of claim 15, wherein the polymer matrix is comprised of an amorphous material selected from the group consisting of polystyrene, polymethylmethacrylate, polysulfone, polyetherimide, polyvinyl chloride, polycarbonate, and SU-8 polymer.

19. The nanocomposite film of claim 15, wherein the polymer matrix is comprised of a crystalline or semi-crystalline material selected from the group consisting of polyethylene, polypropylene, nylon, and polyethyleneterephthalate.

20. The nanocomposite film of claim 15, wherein at least some of the plurality of nanoparticles are selected from the group consisting of oxide nanoparticles, metal nanoparticles, semiconductor nanoparticles, catalytic nanoparticles, and magnetic nanoparticles.

21. The nanocomposite film of claim 15, wherein the plurality of nanoparticles comprises oxide nanoparticles and wherein the polymer matrix is polystyrene.

22. A nanocomposite film obtained by the method according to claim 1, the nanocomposite film defining a thickness and comprising:
a plurality of nanoparticles dispersed in a polymer matrix,
wherein the nanocomposite film defines therein a layer of interlocked and jammed nanoparticles present at or at about the close pack density of the nanoparticles such that without the polymer matrix, the layer of jammed nanoparticles do not change their configuration.

23. A nanocomposite film obtained by the method according to claim 2, the nanocomposite film defining a thickness and comprising:
a plurality of nanoparticles dispersed in a polymer matrix,
wherein the nanocomposite film defines therein a layer of interlocked and jammed nanoparticles present at or at about the close pack density of the nanoparticles such that without the polymer matrix, the layer of jammed nanoparticles do not change their configuration.

24. A nanocomposite film obtained by the method according to claim 7, the nanocomposite film defining a thickness and comprising:
a plurality of stringed nanoparticles dispersed in a polymer matrix,
wherein the nanocomposite film defines therein a layer of interlocked and jammed stringed nanoparticles present at or at about the close pack density of the nanoparticles such that without the polymer matrix, the layer of jammed stringed nanoparticles do not change their configuration and the stringed nanoparticles are partially embedded within the second layer comprising the polymeric material to form an embedded layer.

25. The nanocomposite film of claim 15, wherein at least some of the plurality of nanoparticles comprise non-spherical nanoparticles.

26. The nanocomposite film of claim 15, wherein at least some of the plurality of nanoparticles are exposed at a surface of the nanocomposite film.

27. The nanocomposite film of claim 26, wherein at least some of the plurality of nanoparticles are non-spherical.

28. The nanocomposite film of claim 15, wherein the nanoparticles are randomly packed.

29. The nanocomposite film of claim 15, wherein the nanoparticles are packed in an ordered fashion.

30. The nanocomposite film of claim 15, wherein the nanoparticles are characterized as stringed nanoparticles.

31. The nanocomposite film of claim 15, wherein the polymer matrix comprises SU-8, and wherein the nanoparticles comprise silica.

* * * * *